United States Patent
Aberg et al.

(10) Patent No.: US 10,970,183 B1
(45) Date of Patent: Apr. 6, 2021

(54) SYSTEM AND METHOD FOR IMPROVING MODEL PERFORMANCE

(71) Applicant: The MathWorks, Inc., Natick, MA (US)

(72) Inventors: Robert O. Aberg, South Grafton, MA (US); Joan Wortman, Cambridge, MA (US); Fu Zhang, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 947 days.

(21) Appl. No.: 14/042,236

(22) Filed: Sep. 30, 2013

Related U.S. Application Data

(60) Provisional application No. 61/866,722, filed on Aug. 16, 2013.

(51) Int. Cl.
   *G06F 11/30* (2006.01)
(52) U.S. Cl.
   CPC .................... *G06F 11/30* (2013.01)
(58) Field of Classification Search
   CPC ........................................ G06F 11/30
   USPC ........................................ 702/182
   See application file for complete search history.

(56) References Cited

U.S. PATENT DOCUMENTS

| | | | | |
|---|---|---|---|---|
| 3,653,001 | A * | 3/1972 | Ninke | G06F 3/04845 345/180 |
| 4,180,854 | A * | 12/1979 | Walden | G06F 15/02 708/130 |
| 6,826,521 | B1 * | 11/2004 | Hess | G05B 13/048 700/29 |
| 7,289,964 | B1 * | 10/2007 | Bowman-Amuah | G06F 9/5038 705/1.1 |
| 7,324,931 | B1 | 1/2008 | Warlock | |
| 7,490,319 | B2 * | 2/2009 | Blackwell | G06F 11/3664 717/124 |
| 7,509,244 | B1 * | 3/2009 | Shakeri | G06F 9/5066 703/7 |
| 7,613,589 | B2 * | 11/2009 | Hosagrahara | G06Q 10/04 702/182 |
| 7,991,598 | B1 | 8/2011 | Wood | |

(Continued)

OTHER PUBLICATIONS

Richard Vuduc and et al, "Statistical Models for Empirical Search-Based Performance Tuning" The International Journal of High Performance Computing Applications, vol. 18, No. 1, Spring 2004, pp. 65-94.*

(Continued)

*Primary Examiner* — Andrew Schechter
*Assistant Examiner* — Douglas Kay
(74) *Attorney, Agent, or Firm* — Cesari and McKenna, LLP

(57) ABSTRACT

A system and method intelligently and automatically improves the performance of a model. The system employs heuristics to select a plurality of performance rules that conform to one or more criteria specified for the performance analysis process. The performance rules include checks to be run on the model and offer advice, such as proposed changes that, if made to the model, may improve its performance. The system may evaluate the proposed changes to determine whether or not they produce an improvement in the model's performance. Proposed changes validated as improving model performance are retained, while proposed changes found not to improve performance are removed.

23 Claims, 18 Drawing Sheets

(56) References Cited

U.S. PATENT DOCUMENTS

| | | | |
|---|---|---|---|
| 8,112,471 B2 | 2/2012 | Wei et al. | |
| 8,156,481 B1* | 4/2012 | Koh | G06F 8/35 |
| | | | 717/151 |
| 8,428,927 B2* | 4/2013 | Nakayama | G01R 31/318357 |
| | | | 703/13 |
| 8,832,267 B2* | 9/2014 | Kupershmidt | G06Q 10/0631 |
| | | | 709/224 |
| 8,856,726 B2* | 10/2014 | Conrad | G06F 8/35 |
| | | | 717/104 |
| 8,863,069 B1* | 10/2014 | Venkataramani | G06F 17/5045 |
| | | | 716/100 |
| 8,869,103 B2* | 10/2014 | Conrad | G06F 11/3604 |
| | | | 717/106 |
| 8,966,462 B2* | 2/2015 | Gounares | G06F 9/5016 |
| | | | 717/148 |
| 9,298,858 B1* | 3/2016 | Tomar | G06F 17/5009 |
| 9,298,862 B1* | 3/2016 | Venkataramani | G06F 17/5045 |
| 9,355,000 B1* | 5/2016 | Biswas | G06F 11/3062 |
| 10,318,399 B2* | 6/2019 | Tuffs | G06F 11/3428 |
| 2002/0059054 A1* | 5/2002 | Bade | G06F 17/5022 |
| | | | 703/20 |
| 2003/0004744 A1* | 1/2003 | Greene | G06Q 10/063112 |
| | | | 705/1.1 |
| 2005/0027504 A1* | 2/2005 | Watanabe | G06F 11/3457 |
| | | | 703/22 |
| 2005/0138605 A1* | 6/2005 | Yamamoto | G06F 11/362 |
| | | | 717/135 |
| 2005/0166094 A1* | 7/2005 | Blackwell | G06F 11/3664 |
| | | | 714/38.14 |
| 2006/0149931 A1* | 7/2006 | Haitham | G06F 9/3824 |
| | | | 712/218 |
| 2007/0027652 A1* | 2/2007 | Hosagrahara | G06Q 10/04 |
| | | | 702/182 |
| 2008/0244533 A1* | 10/2008 | Berg | G06F 11/3447 |
| | | | 717/128 |
| 2009/0037879 A1* | 2/2009 | Iyengar | H04L 41/0866 |
| | | | 717/121 |
| 2009/0192867 A1* | 7/2009 | Farooq | G06Q 30/0201 |
| | | | 705/7.29 |
| 2009/0196329 A1* | 8/2009 | Legate | G01S 19/02 |
| | | | 375/141 |
| 2009/0198958 A1* | 8/2009 | Arimilli | H04L 45/06 |
| | | | 712/29 |
| 2011/0295578 A1* | 12/2011 | Aldrich | G06F 8/10 |
| | | | 703/6 |
| 2012/0130680 A1* | 5/2012 | Zink | G06F 11/3442 |
| | | | 702/186 |
| 2012/0197686 A1* | 8/2012 | Abu El Ata | G06Q 10/06 |
| | | | 705/7.39 |
| 2012/0254827 A1* | 10/2012 | Conrad | G06F 8/35 |
| | | | 717/104 |
| 2012/0254830 A1* | 10/2012 | Conrad | G06F 8/35 |
| | | | 717/106 |
| 2012/0286953 A1* | 11/2012 | Bousamra | G16H 50/70 |
| | | | 340/540 |
| 2013/0080641 A1* | 3/2013 | Lui | H04L 67/10 |
| | | | 709/226 |
| 2013/0081005 A1* | 3/2013 | Gounares | G06F 9/5016 |
| | | | 717/148 |
| 2013/0198128 A1* | 8/2013 | Kim | G06N 5/02 |
| | | | 706/47 |
| 2013/0268251 A1* | 10/2013 | Demuth | G06Q 10/06 |
| | | | 703/6 |
| 2014/0047096 A1* | 2/2014 | Kupershmidt | G06Q 10/0631 |
| | | | 709/224 |
| 2014/0122026 A1* | 5/2014 | Aberg | G06F 17/5009 |
| | | | 703/1 |
| 2014/0122028 A1* | 5/2014 | Aberg | G06F 17/50 |
| | | | 703/1 |
| 2014/0122370 A1* | 5/2014 | Jamal | G06Q 30/0201 |
| | | | 705/348 |
| 2014/0214373 A1* | 7/2014 | Jardin | G06T 11/206 |
| | | | 703/2 |
| 2014/0250417 A1* | 9/2014 | Bantas | G06F 17/5063 |
| | | | 716/132 |
| 2014/0282422 A1* | 9/2014 | Tuffs | G06F 11/3428 |
| | | | 717/127 |
| 2014/0282586 A1* | 9/2014 | Shear | G06F 9/5072 |
| | | | 718/104 |
| 2014/0380269 A1* | 12/2014 | Conrad | G06F 11/3604 |
| | | | 717/104 |
| 2016/0357661 A1* | 12/2016 | Furman | G06F 11/3664 |

OTHER PUBLICATIONS

K. Karuri and et al, "Fine-grained Application Source Code Profiling for ASIP Design", DAC 2005, Jun. 13-17, 2005, Anaheim, California, USA. Copyright 2005 ACM 1-59593-058-2/05/0006.*

K. D. Cooper and et al, "Enhanced Code Compression for Embedded RISC Processors", SIGPLAN '99 (PLDI) May 1999 Atlanta, GA, USA, USA, © 1999 ACM I-58113-083-X/99/0004.*

S.Y. Liao and et al "Code Density Optimization for Embedded DSP Processors Using Data Compression Techniques", IEEE Transactions on Computer-Aided Design of Integrated Circuits and Systems, vol. 17, No. 7, Jul. 1998.*

P. J. Mosterman, "MATLAB® and Simulink® for Embedded System Design", © 2007 The MathWorks, Inc (Year: 2007).*

R. Kirner and et al, "Fully Automatic Worst-Case Execution Time Analysis for Matlab/Simulink Models", Proceedings of the 14 th Euromicro Conference on Real-Time Systems 'ECRTS02 (Year: 2002).*

T. Mens and et al, "A Taxonomy of Model Transformation", 1571-0661 © 2006 Else vier B.V., doi:10.1016/j.entcs.2005.10.021 (Year: 2006).*

S. Liu, "Book Reviews From the Discere to the Continuous on Cocrete Mathematics: A Foundation for Computer Science authored by Ronald E. Knuth and Oren Patashnlk, 625 pages, Addison-Wesley, Reading, MA, 1989.", Computer in Physic, Sep./Oct. 1989 (Year: 1989).*

T. Mens and T. Toure, "A Survey of Software Refactoring", IEEE Transactions on Software Engineering, vol. 30, No. 2, Feb. 2004 (Year: 2004).*

C. Weaver, K. C. Barr, E. Marsman, D. Ernst and T. Austin, "Performance analysis using pipeline visualization," 2001 IEEE International Symposium on Performance Analysis of Systems and Software. ISPASS., Tucson, Arizona, USA, 2001, pp. 18-21, doi : 10.1109/ISPASS.2001.990670 (Year: 2001).*

"Getting Started with Using Yottaa for Managing Website Performance," <http://support.yottaa.com/kb/yottaa-product-articles/getting-started-with-using-yottaa-for-managing-website-performance>, May 2, 2011, pp. 1-4.

"Getting Started with Web Performance Optimization," <http://support.yottaa.com/kb/yottaa-product-articles/getting-started-with-web-performance-optimization>, Sep. 13, 2011, pp. 1-5.

Rouleau, Guy, "Model Reference Variants," Guy and Seth on Simulink, The MathWorks, Inc., Sep. 1, 2010, pp. 1-6.

Rouleau, Guy, "Tips for Simulation Performance," Guy and Seth on Simulink, The MathWorks, Inc., Oct. 28, 2010, pp. 1-4.

Popinchalk, Seth, "Improving Simulation Performance in Simulink," The MathWorks, Inc., 2012, pp. 1-10.

Popinchalk, Seth, "Introduction to Model Advisor," Guy and Seth on Simulink, The MathWorks, Inc., Nov. 4, 2008, pp. 1-8.

Popinchalk, Seth, "5 Resources for Simulation Performance," Guy and Seth on Simulink, The MathWorks, Inc., Dec. 6, 2010, pp. 1-4.

"YSlow Help," <http://yslow.org/user-guide/>, Mar. 2013, pp. 1-18.

"YSlow User Guide," <http://developer.yahoo.com/yslow/help/>, Nov. 2008, pp. 1-10.

"Simulink® User's Guide," R2013a, The MathWorks, Inc., Mar. 2013, pp. 1-2983.

* cited by examiner

FIG. 3

| Task | | | | Checks | | | |
|---|---|---|---|---|---|---|---|
| 1 | 2 | 3 | 7 | 10 | 12 | 14 | |
| 2 | 1 | 2 | 4 | 5 | 7 | 15 | |
| 3 | 6 | 7 | 8 | | | | |
| 4 | 9 | 10 | 14 | 15 | 16 | | 16 |

FIG. 4

| Condition #1 | Condition #2 | Condition #3 | Advice #1 | Advice #2 | First Tag | Second Tag | Third Tag |

Simulink Performance Advisor Report - f14.slx

Simulink version: 8.2  
System: f14  
Moder version: 1.11  
Current run: 18-Jul-2013 17:32:31

⊟ Performance Advisor

⊟ Baseline

⊘ Create baseline

Passed Baseline generated successfully. Simulation took 00:00:00.154 seconds

*Input Parameters Selection*

| Name | Value |
|---|---|
| Stop Time | 10 |
| Check to view baseline signals and set their tolerances. | false |

⊟ Simulation

⊟ Checks Occurring Before Update

⚠ Identity resource-intensive diagnostic settings

Some diagnostics incur run-time overhead during simulation. Review the following parameters in the Model Configuration of model 'f14' and the suggested changes for these parameters.

Performance Advisor has taken the necessary actions. For details, see the Action Results section.

| | Severity | Diagnostics checked | Original Value | New Value |
|---|---|---|---|---|
| Solver | | Diagnostics > Solver data inconsistency | none | none |
| Signals | | Diagnostics > Data Validity > Signal resolution | Explicit and warn implicit | Explicit only |
| | | Diagnostics > Data Validity > Division by singular matrix | none | none |
| | | Diagnostics > Data Validity > Inf or nan | none | none |

FIG. 8A

| | | block output | | |
|---|---|---|---|---|
| | | Diagnostics > Data Validity > Simulation range checking | none | none |
| | | Diagnostics > Data Validity > Array bounds exceeded | none | none |
| DSM Blocks | | Diagnostics > Data Validity > Detect read before write | UseLocalSettings | DisableAll |
| | | Diagnostics > Data Validity > Detect write after read | UseLocalSettings | DisableAll |
| | | Diagnostics > Data Validity > Detect write after write | UseLocalSettings | DisableAll |
| | | Diagnostics > Data Validity > Multitask data store | warning | none |
| ∧ Less | | Diagnostics > Data Validity > Detect duplicate data store names | none | none |

Input Parameters Selection

| Name | Value |
|---|---|
| Take action based on advice | automatically |
| Validate and revert changes if time of simulation increases | true |
| Validate and revert changes if degree of accuracy is greater than tolerance | true |

Action Log

Summary of performance validations

| | Before this check | After this check | Improvement |
|---|---|---|---|
| Performance | | | |
| Accuracy | Within given tolerance | Within given tolerance Click to View | |
| Simulation Time | 00:00:00.182 | 00:00:00.137 | 24.81% |

806

Summary of actions

| Actions: |
|---|
| The diagnostic for signal resolution is set to 'Explicit only' |

FIG. 8B

804 {
- The diagnostic for detect read before write has been disabled.
- The diagnostic for detect write after read has been disabled.
- The diagnostic for detect write after write has been disabled.
- The diagnostic for multitask data store has been disabled.

⚠ Check optimization settings

Some optimiztion settings can improve simulation speed. Review the following parameters in the Model Configuration of model 'f14' and the suggested changes for these parameters.

Performance Advisor has taken the necessary actions. For details, see the Action Results section.

| Severity | Diagnostics checked | Original Value | New Value |
|---|---|---|---|
| | Optimization > Block reduction | off | on |
| | Optimization > Conditional input branch execution | on | on |
| | Optimization > Signals and Parameters > Signal storage reuse | on | on |

*Input Parameters Selection*

| Name | Value |
|---|---|
| Take action based on advice | automatically |
| Validate and revert changes if time of simulation increases | true |
| Validate and revert changes if degree of accuracy is greater than tolerance | true |

*Action Log*

Summary of performance validations

| | Before this check | After this check | Improvement |
|---|---|---|---|
| Performance | | | |
| Accuracy | Within given tolerance | Within given tolerance Click to view | |
| Simulation Time | 00:00:00.145 | 00:00:00.176 | -21.31% |

808 → Accuracy, Simulation Time

810 → Actions:
Performance was not improved and suggested actions were reverted. The model settings have been set back to their original values.

⊟ Checks that Require Simulation to Run

 Check solver type selection

The solver type is ode15s. The initial stifness analysis suggests that you use solver ode45. Review the solver settings in the Model Configuration of model 'f14'.

Performance Advisor has taken the necessary actions. For details, see the Action Results section.

| Severity | Setting checked | Original Value | New Value |
|---|---|---|---|
| | Solver name--Solver type | ode15s--Implicit | ode45a--Explicit |

*Input Parameters Selection*

| Name | Value |
|---|---|
| Take action based on advice | automatically |
| Validate and revert changes if time of simulation increases | true |
| Validate and revert changes if degree of accuracy is greater than tolerance | true |

*Action Log*

FIG. 8D

Summary of performance validations

| | Before this check | After this check | Improvement |
|---|---|---|---|
| Performance | | | |
| Accuracy | Within given tolerance | Beyond given tolerance Click to view | |
| Simulation Time | 00:00:00.179 | 00:00:00.109 | 38.82% |

Actions:

Performance was not improved and suggested actions were reverted. Solver type has not been changed and still 'ode15s'.

⊟ Simulation Targets
    ⊟ Check Simulation Modes Settings

⚠ Select simulation mode

The current simulation mode is Normal mode, a suggested alternate mode is Accelerator mode. A comparison between the current mode and other simulation modes is shown in following figure. Review it and choose your simulation mode.

Open the Simulation > Mode menu to manually select a simulation mode. Alternatively, click the 'Modify All' button below to have Performance Advisor select the suggested simulation mode for your model.

| Measurement Name | Value | Units |
|---|---|---|
| Breakeven point between Normal mode and Accelerator mode occurs after this many simulations. | 215 | number of simulations |
| Simulation time | 10 | simulation seconds |

| Measurement Name | Normal | Accelerator | Units |
|---|---|---|---|

FIG. 8E

|  | mode | mode |  |
|---|---|---|---|
| Time elapsed during build | 0 | 8.883 | wall clock seconds |
| Time elapsed during Simulation | 0.17522 | 0.13363 | wall clock seconds |
| Simulation rate | 57.0701 | 74.8349 | simulation seconds/wall clock seconds |
| Simulation rate without setup and terminate overheads | 200 | 294.1178 | simulation seconds/wall clock seconds |

*Input Parameters Selection*

| Name | Value |
|---|---|
| Take action based on advice | manually |
| Validate and revert changes if time of simulation increases | false |
| Validate and revert changes if degree of accuracy is greater than tolerance | false |

⊟ Check Compiler Optimization Settings

---

☑ Select compiler optimizations on or off

Passed

Check passed because the simulation mode is set to neither Accelerator nor Rapid Accelerator mode.

*Input Parameters Selection*

| Name | Value |
|---|---|
| Take action based on advice | manually |
| Validate and revert changes if time of simulation increases | false |
| Validate and revert changes if degree of accuracy is greater than tolerance | false |

FIG. 8F

SYSTEM AND METHOD FOR IMPROVING MODEL PERFORMANCE

CROSS-REFERENCE TO RELATED APPLICATIONS

The present application claims the benefit of U.S. Provisional Patent Application Ser. No. 61/866,722, which was filed on Aug. 16, 2013, by Robert O. Aberg, Joan Wortman and Fu Zhang for SYSTEM AND METHOD FOR IMPROVING MODEL PERFORMANCE, which is hereby incorporated by reference in its entirety.

BRIEF DESCRIPTION OF THE DRAWINGS

The invention description below refers to the accompanying drawings, of which:

FIG. 3 is a schematic illustration of a data structure configured to store an association of model tasks and checks according to an embodiment;

FIG. 4 is a schematic illustration of a data record configured to store information associated with a check according to an embodiment;

FIGS. 8A-F are partial views of a schematic illustration of a detailed performance analysis report according to an embodiment;

DETAILED DESCRIPTION OF ILLUSTRATIVE EMBODIMENTS

Background

Figure 1:
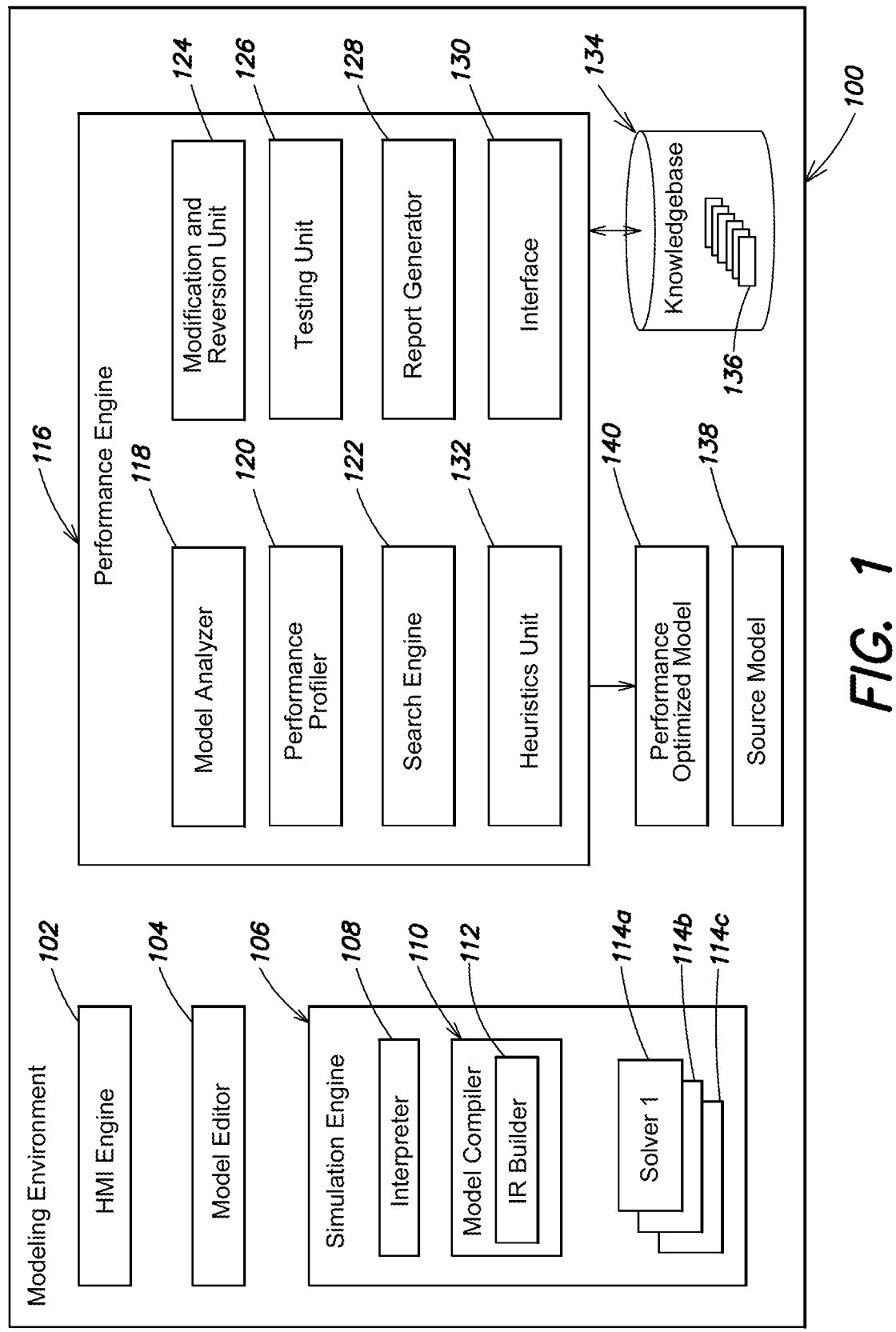
FIG. 1 is a partial, functional block diagram of a modeling environment according to an embodiment.

Engineers, designers and others often use computer-based modeling tools for algorithm development, design exploration, design creation, and code generation. Typically, one or more models may be constructed to represent a system, such as a dynamic system, and the model may be executed to simulate the behavior of the dynamic system. These models can become large and complex as the systems being modeled become more complicated. As a result, it may take a long time, from a user's perspective, for such models to execute and generate results. In addition, the models may consume substantial memory resources and, if sufficient memory is not available, model execution may fail and memory allocation errors may be thrown. Users may become frustrated with the length of time it takes for such models to execute to completion, and with the generation of memory and other errors that disrupt execution of a model.

User guides and other materials may provide suggestions, such as closing displays, disabling diagnostics and other best practices, that may reduce execution time and memory demands. Sometimes, however, these suggestions fail to reduce execution time and/or memory demands. This can be due to the complex nature of models, including the number and various combinations of different options and settings. For example, while a given suggestion may reduce execution time of a model having a first setting, the suggestion may not work for a model having a combination of the first and a second setting. In addition, some suggestions can change the results computed by the model. Accordingly, many users find it difficult and time-consuming to improve model performance, and the process is not always successful.

Overview

The invention relates to systems and methods for intelligently and automatically improving the performance of a source model, such as the execution speed and/or memory usage of the source model. The systems and methods may analyze the source model, obtain a set of performance rules and apply the performance rules to the model. The performance rules may run checks on the model, and may offer advice depending on the results of the checks. The advice may include proposed changes that, if made to the source model, may improve its performance. The systems and methods may evaluate whether the advice actually improves the performance of the source model, retain the proposed changes if performance is improved, revert the proposed changes if performance is not improved, and may generate a report identifying the advice validated as improving the model's performance. The report may also quantify the improvement in performance achieved by the validated advice. Additionally, the systems and methods may utilize heuristics to select the set of performance rules to be applied and evaluated. The heuristics also may control the performance analysis process so that it satisfies or conforms to one or more criteria, which may be user-specified.

The systems and methods of the invention may be implemented through a performance engine, which may be part of a modeling environment. The performance engine may include a model analyzer, a performance profiler, a search engine, a heuristics unit, a modification and reversion unit, a testing unit, and a report generator. The performance engine also may include or have access to a knowledgebase. The knowledgebase may be configured with a plurality of performance rules developed to improve model performance. The performance rules include checks that, when run, may look for the existence of one or more model conditions, and may generate particular advice if the one or more model conditions are found. The advice may include a proposed change that, if made to the model, may improve its performance. The performance rules may be organized as a tree structure within the knowledgebase, and at least some of the performance rules may be tagged with one or more characteristics. The performance engine also may have access to one or more community networks that contain additional performance rules and/or rankings of performance rules. For example, the additional performance rules and/or rankings may be stored in postings or on web logs (blogs) by experienced users of the modeling environment.

In an embodiment, the performance engine may receive the source model. The performance profiler may instrument the source model, and execute it to generate baseline run-time information, which may include performance data, the number of zero crossings, the number of continuous states, etc. The baseline run-time information may be stored in a log or in a memory. Exemplary performance data may include model compilation time, execution time including both initialization time and execution time (the combination of which may be referred to as simulation time), number of function calls, and memory usage. The user may control the generation of baseline run-time information by setting one or more options. In addition to executing the source model, or instead of executing it, the model analyzer may perform static analysis on the source model. The model analyzer may evaluate the model, and may identify attributes of the source model.

The performance engine may receive one or more criteria. For example, the user may specify an analysis completion time goal by which the performance analysis process is to be completed, such as ten minutes, one hour, overnight, etc. so that the performance engine can plan out the checks and their analysis in less than or equal to the level of detail that is inferred by the analysis completion time goal. Alternatively, the user may specify a timeout criterion for the performance engine to halt analysis if one check or an aggregation of checks has exceeded the timeout criterion. The user also may specify a performance target and/or threshold to be achieved. In an embodiment, the performance engine may stop its evaluation once the target or threshold is met. The user may also specify one or more user tasks for the source model. Exemplary user tasks include first execution, clean (or first) build, incremental build, clean (or first) code generation, incremental code generation, interactive simulation, batch simulation, code generation, comparison to field data, design optimization simulations, stochastic/Monte Carlo robustness testing, model coverage testing, formal model verification, for example with a tool such as the Simulink Design Verifier from The MathWorks, Inc., regression testing, and sensitivity analysis. The user may also designate one or more performance rules that are to be applied and/or are not to be applied by the performance engine. Other criteria also may be specified by the user.

In an embodiment, a user interface may be presented to receive user-specified criteria, and to display information regarding the performance analysis process.

The search engine may identify a group of performance rules to be applied by the performance engine. In an embodiment, the heuristics unit may guide the search for the group of performance rules based on the received criteria and model attributes. For example, the heuristics unit may compare the received criteria to the tags of the performance rules to select the group of performance rules, such as those rules whose tags match the received criteria. Alternatively, the heuristics unit may direct the search engine to traverse particular branches of the tree. The heuristics unit may also control how the performance engine applies the group of performance rules. For example, the heuristics unit may determine that the performance rules should be applied progressively, e.g., one at a time, as a batch, e.g., all at once, or in a hybrid mode where some rules are performed progressively and others are performed as a batch.

The performance engine may apply the performance rules from the group to the source model, identify the advice output by at least some of the rules, and determine whether or not that advice improves the model's performance. In particular, the one or more checks associated with a performance rule may specify one or more conditions or settings of the model, such as the model's structure, solver information, the settings of one or more model-level and/or object-level options or parameters, a stiffness estimation, component-level, block-level and/or port-level parameters or properties. The model's structure may include the number and type of objects, e.g., blocks and components, that make up the source model, and the connections or relationships among these objects and components. The model analyzer may evaluate the model and determine whether the one or more specified conditions or settings are present in the model. If the one or more specified conditions or settings are found in the model, in which case the rule may produce a warning or failure, the performance engine may evaluate the rule's advice.

For example, the advice from a given performance rule may suggest making a change to the source model, and the performance rules may include one or more scripts that may be executed to apply the change to the source model. The modification and reversion unit of the performance engine may make the change, and the performance profiler may obtain new performance data, i.e., execution speed and memory usage, for the source model as changed. The testing unit may compare the new performance data to the previously obtained baseline information. If the new performance data is better, the performance engine may retain the proposed change that was made to the model. On the other hand, if the new performance data fails to meet the threshold specified by the user, or is worse than the baseline information, the modification and reversion unit may undo the proposed change, thereby reverting back to the original model. In other words, the performance engine applies the proposed change to the model, and then determines whether or not to retain the proposed change. Information regarding the new performance data and the baseline information may be displayed on the user interface, thereby providing an indication of the progress being made in improving the source model's performance.

The testing unit of the performance engine also may evaluate one or more results of the changed model, and may compare them to results of the source model. Results may include output values generated by the changed and source models, intermediate results generated by the changed and source models, verification or validation outcomes, such as model coverage, cyclomatic complexity, solver Jacobian, A-matrix coupling, and other model results. The testing unit may determine whether the new results, such as new output values, differ from the original results, e.g., original output values, for example by some tolerance, which may be user or programmatically specified. If so, the performance engine may undo the proposed change, even though it may have resulted in an improved execution time and/or memory usage. The performance engine may evaluate each of the performance rules in the group in a similar manner.

In an embodiment, the report generator may create a report that includes the advice, e.g., the proposed changes, validated as improving the performance of the source model. The report also may include quantitative values regarding the increase in performance that was achieved, e.g., the reduction in execution time and/or memory usage. The report may be presented to an output device, such as a display or a printer, for review by the user. In an embodiment, the user may choose to apply some of all of the validated advice to the source model.

In an embodiment, the performance engine may create a performance-enhanced model by automatically modifying the original source model with the changes validated to improve the model's performance. The performance engine may save and output this performance-enhanced model, e.g., to the user. At least some of the changes may be saved in a new configuration set generated for the source model by the performance engine and optionally stored inside the model, in a data dictionary, or in an external data file or repository. A configuration set specifies a set of model-level options for the source model. The user may then select or reference this new configuration set, e.g., make it the active configuration set, when executing the source model, performing code generation for the source model, or other analysis of the model beyond execution and code generation. Changes to the structure of the model, such as the replacement of an original block with one or more new blocks, may be saved by adding one or more variant objects to the model that also preserves the original structure of the source model, e.g., by saving the original blocks as well. The user may control the one or more variant objects so that the newly added blocks are utilized, rather than the original blocks of the source model. For example, changes may be saved in one or more new variant parameter sets, which may be stored inside the model, in a data dictionary, or in an external data file or repository. The user may select a particular variant parameter when executing the model, performing code generation or performing other model analysis. The performance engine also may include a traceability function that links changes to the source model to the performance rules and/or the advice that triggered the respective change, and to the performance improvements achieved by those changes.

The systems and methods of the invention may be implemented as a web service. In particular, the source model and the user specified criteria may be uploaded through a web service request to a web server that includes the performance engine. The performance engine at the web server may process the source model, generate a report and transmit the report and the performance optimized model to the user.

Modeling Environment

FIG. 1 is a partial, functional block diagram of a modeling environment 100 in accordance with an embodiment. The modeling environment 100 may have a plurality of modules or components. For example, the modeling environment 100 may include a human-machine interface (HMI) engine 102, a model editor 104, and a simulation engine 106. The simulation engine 106 may include an interpreter 108, a model compiler 110 that, in turn, may include one or more Intermediate Representation (IR) builders, such as IR builder 112, and one or more, and preferably a plurality, of solvers, such as solvers 114a-c. The HMI engine 102 may be configured to create and present one or more User Interfaces (UIs), such as Graphical User Interfaces (GUIs), on the display of a workstation or other data processing device. The GUIs may be operated by users to initiate various model-related tasks, such as opening, creating and saving models. The model editor 104 may be configured to perform the selected operations, such as open, create, edit, and save, in response to the user inputs. The simulation engine 106 may be configured to execute, e.g., compile and run or interpret, models, such as computer-generated simulation models, created or opened by the user, using one or more of the solvers 114a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink 7 User's Guide* from The MathWorks, Inc. (March 2013 ed.), which is hereby incorporated by reference in its entirety.

In an embodiment, the modeling environment 100 may include a performance engine 116 that, in turn, may include a plurality of components or modules. The performance engine 116 may include a model analyzer 118, a performance profiler 120, a search engine 122, a modification and reversion unit 124, a testing unit 126, a report generator 128, an interface 130, and a heuristics unit 132. The modeling environment 100 may also include a knowledgebase 134 configured to store a plurality of performance rules, indicated generally at 136, having checks that may be run on selected models.

The modeling environment 100 may include other components (not shown), such as a code generator for generating code, such as source code, for a model, a target language compiler for compiling the generated source code, a differencing engine for comparing two models and identifying the differences between them, a merge engine for merging two models, a model verifier for testing and verifying the behavior of a model, etc.

In an embodiment, the performance engine 116 and/or one or more of the components thereof may be implemented through one or more software modules or libraries containing program instructions pertaining to the methods described herein. The software modules may be stored in a memory, such as a main memory, a persistent memory and/or a computer readable media, of a workstation or other data processing machine or device, and executed by one or more processing elements. Other computer readable media may also be used to store and execute these program instructions, such as non-transitory computer readable media, for example optical, magnetic, or magneto-optical media. In another embodiment, the performance engine 116 and/or one or more of the components thereof may comprise hardware registers and combinational logic configured and arranged to produce sequential logic circuits. In alternative embodiments, various combinations of software and hardware, including firmware, may be utilized to implement the described methods. The knowledgebase 134 may be implemented as one or more data structures or objects stored on a memory, such as a hard disk drive, a flash memory, a random access memory (RAM), a computer readable medium, etc.

In other embodiments, the performance engine 116, one or more components thereof, or the knowledgebase 134 may be separate from the modeling environment 100. In such cases, the performance engine 116 or knowledgebase 134 may be in communication with the modeling environment 100, e.g., through local or remote procedure calls, or an Application Programming Interface (API).

In an embodiment, the modeling environment 100 is a high-level modeling environment. Suitable high-level modeling environments include the MATLAB® and Simulink® technical computing environments from The MathWorks, Inc., as well as the Simscape physical modeling system and the Stateflow charting tool also from The MathWorks, Inc., the MapleSim physical modeling and simulation tool from Waterloo Maple Inc. of Waterloo, Ontario, Canada, the LabVIEW programming system and the NI MatrixX model-based design product both from National Instruments Corp. of Austin, Tex., the Visual Engineering Environment (VEE) from Agilent Technologies, Inc. of Santa Clara, Calif., the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, the System Generator system from Xilinx, Inc. of San Jose, Calif., and the graphical modeling systems described in U.S. Pat. No. 7,324,931 for Conversion of Model Components Into References and U.S. Pat. No. 7,991,598 for Method and System for Modeling a Mechanical System, which are hereby incorporated by reference in their entireties, among others. Models created in the high-level modeling environment may contain less implementation detail, and thus operate at a higher level than certain programming languages, such as the C, C++, C#, and SystemC programming languages.

Those skilled in the art will understand that the MATLAB® technical computing environment is a math-oriented, textual programming environment for digital signal processing (DSP) design, among other uses. The Simulink® technical computing environment is a model-based design environment for modeling and simulating dynamic systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In another embodiment, a lower level programming language, such as the C, C++, and C# programming languages, among others, may be used to create one or more models.

Models constructed in the modeling environment 100 may include textual models, graphical models, and combinations of graphical and textual models. A given model, when executed, may simulate, e.g., approximate the operation of, a system. Exemplary systems include physical systems, such as weather systems, financial markets, plants, controllers, etc. A model may be executed in order to simulate the system being modeled, and the execution of a model may also be referred to as simulating the model.

One or more models, such as a source model 138, may be included in the modeling environment 100. In addition, the performance engine 116 may be configured to generate one or more models, such as a performance optimized model 140.

Figure 2:
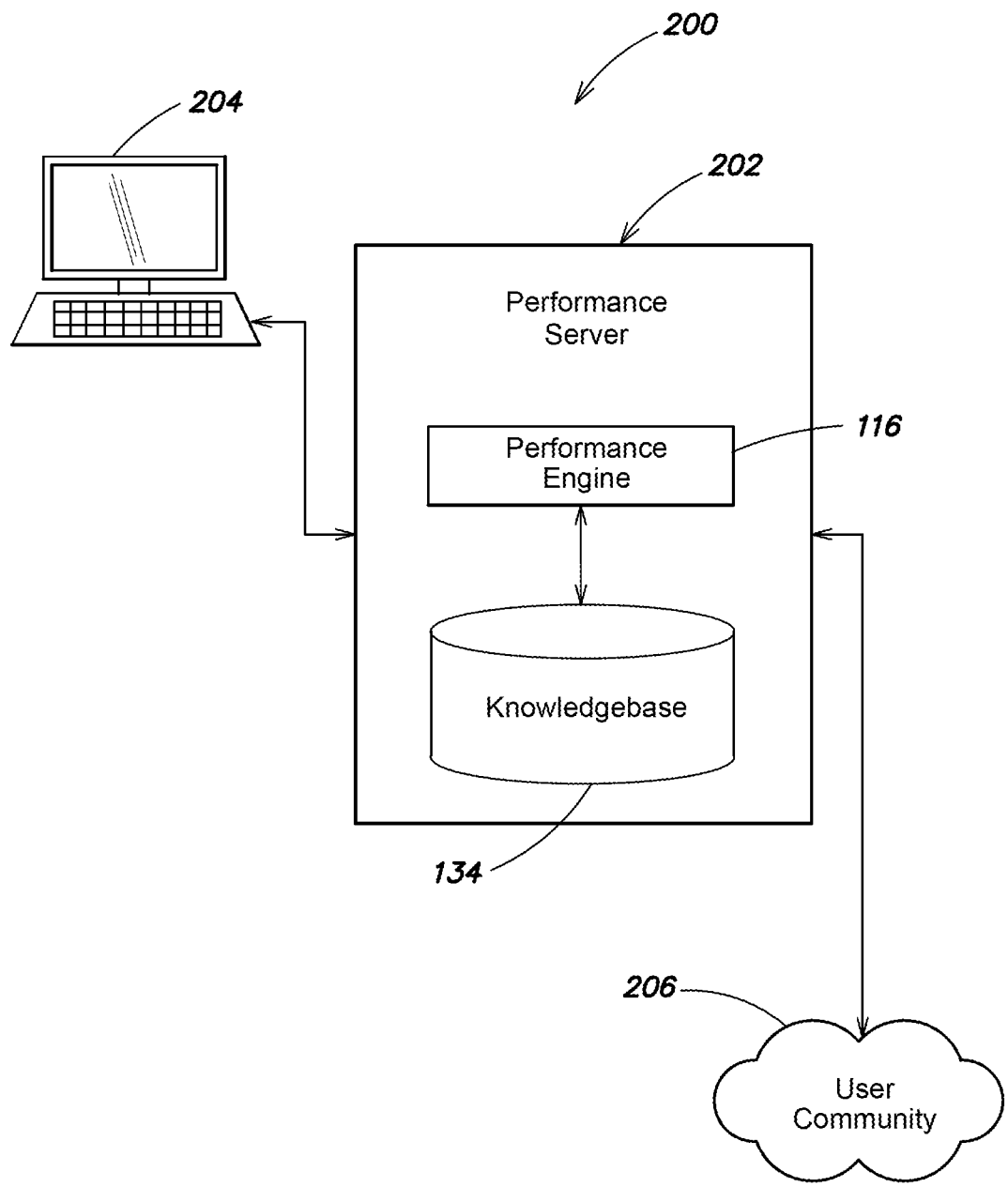
FIG. 2 is a schematic illustration of an environment for improving model performance according to an embodiment.

FIG. 2 is a schematic illustration of an environment 200 for improving model performance according to an embodiment. The environment 200 may include a performance server 202 that includes the performance engine 116 and the knowledgebase 134. The environment 200 may also include at least one client workstation 204 and a user community 206 represented by a cloud symbol. The client workstation 204 and the user community 206 may be in communication with the performance server 202, e.g., through one or more networks, such as Local Area Networks (LANs), Wide Area Networks (WANs), Virtual Private Networks (VPNs), the Internet, or any combination thereof. The client workstation 204 may include a modeling environment through which a user of the client workstation 204 can open, create and revise one or more models. The models, or information regarding the models, may be transmitted to the performance server 202 for analysis. The user community 206 may represent a collection of users, typically experienced users, of the modeling environment, who have developed one or more performance rules that may be applied to models to improve performance. These performance rules may be different from those stored in the knowledgebase 134. The performance server 202 may access these additional performance rules for application to the one or more models from the client workstation 204. The user community 206 may also include one or more rankings of performance rules.

Exemplary user communities include the MATLAB Central on-line community and the LabVIEW Advanced Virtual Architects (LAVA) on-line community, among others.

As noted, the knowledgebase 134 may include a plurality of performance rules 136, and the performance rules may include checks that may be applied to a model to determine whether a change should be made to the model to improve its performance, such as execution time and/or memory usage. The checks may be configured to determine whether one or more conditions exist in the model. Exemplary conditions include model-level settings, such as solver type, block-level settings, such as the interpolation methods and intermediate data types of a look-up table block, and the existence of particular blocks in the model, such as slow diagnostic blocks not needed by the design, unconnected blocks that do not change the outcome, or visualization blocks that decrease performance and do not contribute to the results. For example, a first check may determine whether a particular solver is being used to simulate the model. The check may also include advice if the condition is satisfied. The advice might include performing a change to the model. For example, if a model is configured to use a particular solver, such as the first solver 114a, a check may specify the use of the first solver 114a, and include advice suggesting that a different solver, such as the second solver 114b, be used instead.

Checks, including the conditions and the advice associated with them, may be developed by experienced users of the modeling environment 100. Experienced users may include the entity, e.g., the company, that created and maintains the modeling environment 100, highly skilled users of the modeling environment 100, such as Applications Engineers (AEs), consultants, and others. Checks may include code and data, and the code may be executed, for example by the performance engine 116. In an embodiment, checks may be objects having methods and data. Performance rules as well as the association of selected checks to performance rules also may be developed by experienced users. Performance rules, which may specify an order by which the checks associated with the rule are to be performed on a model, may be data driven algorithms or all code.

Selected checks may be organized into groups related to particular model tasks. For example, a first task may optimize a model for interactive use during model simulation. A group of checks may be identified for performing this task, i.e., attempting to optimize a model for interactive use. The group of checks may be associated with the task. A second task may optimize a model for processing batch input data without user interaction. A second group of checks may be identified for performing this second task. Other tasks may include comparing model output to data generated in the field, i.e., real world data, extracting a linear model from an original model, searching for design flaws, e.g., with a tool such as Polyspace, optimizing a model for first-time execution, repeatedly re-executing a model during a model design phase, and applying different input data sets to a model whose design is fixed, clean (or first) build, incremental build, clean (or first) code generation, incremental code generation, code generation, comparison to field data, design optimization simulations, stochastic Monte Carlo robustness testing, model coverage testing, formal model verification, regression testing, and sensitivity analysis, among others.

In an embodiment, the association of checks to various model tasks may be stored in one or more data structures for example by the performance engine 116. FIG. 3 is a schematic illustration of a data structure, in particular an array 300, configured to store an association of model tasks and checks. The array 300 may have a plurality of columns and rows whose intersections define cells or records for storing information or data. In particular, the array 300 may include a Task column 302 and a Checks column 304. The array 300 also may include a plurality of rows 306a-d. Each row 306 may store information for a particular task and the checks associated with that task. In particular, for each row, such as row 306a, the cell corresponding to the task column 302 may include an identifier of a particular task, e.g., Task 1. The cell or sub-cells corresponding to the row's Checks column 304 may include information identifying the checks associated with that task, e.g., checks 2, 3, 7, 10, 12 and 14. Row 306b corresponds to Task 2, which is associated with checks 1, 2, 4 5, 7, 15 and 16. A given check may be associated with more than one task, and different numbers of checks may be associated with the various tasks. For example, Check 2 is associated with Tasks 1 and 2, and Task 3 is associated with three checks, while Task 2 is associated with seven checks.

It should be understood that the array 300 of FIG. 3 is meant for illustrative purposes and that other data structures, such as linked lists, stacks, queues, trees, etc., may be used. The array 300 may be stored in the knowledgebase 134. Nonetheless, the array 300 may be stored in other locations, such as within the performance engine 116, among other places. The association of checks to tasks, as set forth in the array 300, may be determined through experience. For example, it may be determined after analyzing many models designed for interactive use that checks 9, 10, 14, 15 and 16, as illustrated at row 306d, often provide effective advice for improving the performance of such models. It may also be determined after analyzing many models designed for batch processing of input data without any interactive use that checks 6, 7 and 8, as illustrated at row 306c often provide effective advice for improving the performance of such models.

The checks also may be stored in one or more data structures. FIG. 4 is a schematic illustration of a data record 400 representing a check as included in a performance rule. In an embodiment, the data record 400 may include a plurality of fields or cells configured to store data or information. Specifically, the data record 400 may include one or more condition fields, such as first, second and third condition fields 402, 404 and 406. Each condition field 402, 404 and 406 may store a condition associated with the check. The data record 400 also may include one or more advice fields, such as first and second advice fields 408 and 410. The advice fields 408 and 410 may include advice for improving the performance of a model that satisfies the conditions specified in one or more of the condition fields 402, 404 and 406.

A condition may be a set theory item, such as any from {list}, not in {list}, and is equal to <value>, among others. A condition also may involve a threshold or limit, such as greater than <threshold>, at least <lower limit>, and the thresholds and limits may be user-specified or specified programmatically.

For example, a condition of a first check may relate to the presence of a particular element or object in a model. Specifically, the condition may be whether the model includes a MATLAB function block. When a model having a MATLAB function block is executed, the MATLAB interpreter may be called at each model time step to execute the MATLAB function block. This may slow model execution time. The advice for the first check may include a proposal to replace the MATLAB function block with a different block, such as a Fcn block or a Math Function block, which may improve the simulation speed of the model. A condition of a second check may relate to the model's maximum step size. Specifically, the condition may specify a manually specified maximum step size that is considered too small. The advice for the second check may include changing the model's maximum step size, e.g., to an automatically set maximum step size. A first condition of a third check may relate to whether a model includes a Random Number block whose output is fed into an Integrator block. A second condition of the third check may relate to whether the model is a continuous system. The advice for the third check, which may be presented when the two conditions are satisfied, may include replacing the Random Number block with a Band-Limited White Noise block. A condition of a fourth check may relate to model optimization settings. Specifically, the condition may specify a disabled optimization setting, such as the Block Reduction model optimization setting. The advice for the fourth check may include enabling the Block Reduction model optimization setting. Other conditions may relate to the behavior or dynamics of the model, such as model states that may cause the solver to slow down or signals that cause a high number of zero crossings.

It should be understood that the knowledgebase 134 may include many other performance rules.

A given check may provide different advice depending on the task for which the given check was selected. For example, during a design task, the user may need to observe the model's simulation results interactively or in real time, and may need to include many display blocks in the model to observe the simulation results of different signals. Real time may refer to model execution that matches the implementation of the model, e.g., generated code executing on target hardware. For example, 1 second of model execution matches 1 second of execution by the target hardware. Real time execution is typically needed when a model interacts with a physical system or device or with a human user. Interactive execution may refer to the ability of a user to interact with the model during execution, e.g., to select, view and/or adjust model or block parameters, typically from a supervisory or debugging perspective. The user also may need to turn on animation to understand how the model works, or turn on one or more diagnostic functions to make sure the model's design is correct. These display blocks and the animation or diagnostic functions may slow down the simulation, e.g., execution, of the model, but may be needed by the user in order to obtain a correct design. The advice for the design task may be to on turn certain diagnostic and animation functions, to get the correct design. For the batch simulation task, the user will usually not need the above mentioned functions, and thus the advice could be to turn off these functions and get better performance, and these rules could be adjusted by the user.

The data record 400 also may include one or more tag fields, such as tag fields 412, 414 and 416. The tag fields 412, 414 and 416 may include information that relates to the running of the check. For example, the first tag field 412 may include information regarding the length of time it takes to run the particular check. For example, the first tag field 412 may include information indicating whether the respective check can be completed fast, moderate or slow. The second tag field 414 may include user rating information for the respective check. The user rating may be specified on a scale of 1 to 5 with 5 being a check that is highly rated, e.g., consistently provides an improvement in model performance, and 1 being a poorly rated check, e.g., a check that does not consistently provide an improvement in model performance. The third tag field 416 may identify one or more other checks that are associated with this check. That is, multiple checks may be associated as a group, and the heuristics unit 132 may be configured to apply the checks in a batch mode when analyzing a model. Additional examples of tags include a time value, rating, or other measurement of the relative cost of the check in terms of time, memory, or other computer resource measurement, either as absolute values or as a scaling or heuristic value of analysis-time-per-block.

It should be understood that the data record 400 may include additional fields, such as an identifier field, a description field, a tagword field to support user searches for relevant checks and rules, action fields for describing model changes when criteria are satisfied, acceptance criteria fields for specifying metrics that confirm when changes are deemed to improve performance, and reporting template fields to generate analysis and change confirmation sections in the report.

FIGS. 5A-D are partial views of a flow diagram of a method in accordance with an embodiment. The performance engine 116 may receive the identification of a source model to be analyzed, as indicated at block 502. In an embodiment, the HMI engine 102 may present one or more advisor windows on a display. The advisor window, which may appear to the user as a model-based tool, may include one or more data entry boxes or other window elements through which a user can specify the model to be analyzed. In another embodiment, a user may open a model and enter a command to automatically improve the model's performance. The performance engine 116 also may receive once or more criteria or settings for controlling the performance analysis, as indicated at block 504. The criteria and/or settings may be user-specified, programmatically specified, or some combination thereof. At least some of the criteria and/or settings may be specified through data entry elements, such as radio buttons, drop down menus, data entry fields, etc., of the one or more advisor windows. Exemplary criteria or settings may include an analysis completion time goal, a time to complete the performance analysis (e.g., a timeout), a performance threshold to be achieved, such as a reduction in execution time and/or memory usage, an accuracy threshold to be maintained or achieved, a mode, such as interactive, batch input data, code generation, etc., a specification of one or more particular checks that are to be performed on the model and/or avoided, and whether to search for and obtain one or more checks from the user community 206. It should be understood that other criteria or settings may be specified, such as criteria or settings that indicate intended applicability for various modeling applications (continuous time models, finite state machine models, hydraulic models, software models, etc).

The performance profiler 120 may obtain baseline performance data for the model, as indicated at block 506. The performance profiler 120 may execute the model one or more times to obtain the baseline performance data. The baseline performance data obtained by the performance profiler 120 may include a total time required to simulate the model, the total time spent executing all invocations of functions included in the model, such as model-level and/or block-level functions, the number of times model-level and/or block-level functions are invoked, the average time required for each invocation of the functions, time spent compiling the model, building simulation code and data files for the model, initializing the model, time spent in various block-by-block execution phases (calls to compute derivatives, outputs, state update, etc.), and time spent in the solver processing resets, Jacobian computations, zero crossing detections and solving algebraic loops. The baseline performance may also include total memory needed to simulate the model, memory needed to compile the model, memory needed to build simulation code and data files, memory needed to initialize the model, etc. The model analyzer 118 also may gather statistics and/or attributes of the identified model, as indicated at block 507. For example, the performance profiler 120 may determine the total number of objects or elements within the identified model, such as blocks, the number of continuous states, the types objects included in the model, the highest frequency of a source block, a stiffness estimation, a number of detected zero crossings, which continuous state caused the most failed steps, which block's zero-crossing signals caused the most chatterings in the system, etc.

In an embodiment, a user may control the collection of performance data and/or the statistics or attributes. For example, the user may select one or more settings that control the collection of performance data and/or the statistics or attributes.

The performance engine 116 may create one or more data structures, such as files, for storing information concerning the performance analysis being performed for the identified model. The criteria, baseline performance data, model results, and model attributes and statistics may be stored in the one or more files.

The search engine 122 may search the knowledgebase 134 and select one or more performance rules and/or checks to be run against the source model based on the received criteria or settings and/or the attributes or statistics, as indicated at block 508. In an embodiment, the heuristics unit 132 may guide the search engine 122 in the selection of the one or more checks to be run. More specifically, the heuristics unit 132 may be configured to work with the search engine 122 to select checks that satisfy the one or more received criteria, e.g., from the user. The heuristics unit 132 may also be configured to select the checks to be run based on the statistics and/or attributes that were gathered by the model analyzer 118. For example, if the total number of objects or elements in the model is less than a threshold, then the heuristics unit 132 may not select checks associated with an accelerator mode.

For example, suppose a user specified a short time goal of performance analysis, such as five (5) minutes, and batch input data mode. In this case, checks that have a history of taking a longer time to run, for example, solver type selection, may be excluded. Other checks, such as check certain optimizations of the model, which have a history of quickly completing, may be executed. The heuristics unit 132 may also be configured to consider attributes of the model, such as the number of blocks included in the model, the types of blocks, etc., in determining which checks to run.

The heuristics unit 132 may be configured with information obtained from experience operating the modeling environment 100. An example of a heuristics-based operation is that models containing hydraulic elements (for example, using the SimHydraulics modeling environment from The MathWorks, Inc.) should be examined closely for the applicability of the currently selected solver for the model vs. a stiff solver to give better accuracy and execution time. It may be the case that the current solver gives wrong results, so the heuristics unit 132 would weigh the current simulation speed of the model against the current simulation accuracy, and adjust the advice accordingly. For example, a currently selected solver that is likely giving inaccurate results may cause the heuristics unit 132 to produce advice that may say "The current solver and step size combination produces results with level or spectral distortions beyond ZZ % of <criteria>. The accuracy is brought within <criteria> using the <suggested-named> solver and tolerance/step size settings, even though the simulation runs 20% slower".

Typically, a group of checks will be selected for use with the model. The group of checks may be selected manually by the user or automatically by the heuristics unit 132. For example, the heuristics unit 132 may be configured to select checks that apply to the model. Suppose a source model has all discrete-time blocks. In this case, continuous-time solver checks are unlikely to apply, and the heuristics unit 132 may be configured not to select such checks for such a source model. In another example, a source model may include a portion having physical modeling blocks, such as blocks from the Simscape environment from The MathWorks, Inc. The heuristics unit 132 may be configured with a threshold for determining when such a portion of a model is large enough to justify the running of a partitioning analysis or a local solver applicability analysis. If the portion of the model exceeds the threshold, then there may be a low chance that a partitioning check would produce useful results if the user has requested a quick analysis. The heuristics unit 132 may be configured to skip such partitioning checks in these circumstances.

The heuristics unit 132 may implement general guidelines. An exemplary general guideline that may be implemented by the heuristics unit 132 is that checks that do not need model compilation typically take less time to run. Other general guidelines may be implemented in the heuristics unit 132.

After selecting the checks to be performed, the performance engine 116 may proceed to run the selected checks. In an embodiment, the performance engine 116 may determine whether there is at least one check from the group of selected checks still to be run, as indicated at decision block 510. If so, the performance engine 116 may run at least one check, as indicated by Yes arrow 512 leading to block 514 (FIG. 5B). If there are multiple checks to be run, the performance engine 116 may run them progressively, e.g., one at a time, as a batch, or in some combination of progressively and batch. The running of a check may include determining whether the one or more conditions associated with the check are satisfied by the model being evaluated. The performance engine 116 may determine whether the check did not pass and instead generated a warning, error or a failure, which in an embodiment means that the one or more conditions included in the check are present in the model, e.g., the conditions are satisfied by the model. If the one or more conditions included in the check are not found in the model, e.g., the conditions are not satisfied by the model, then the check may be considered to have passed. It should be understood that a warning or failure may be generated even though fewer than all of the conditions specified by the check are found in the model. A check may include information for use in determining when the check generates a warning, a failure, or is considered to have passed.

For checks that generated warnings or that failed, the performance engine 116 may determine the advice associated with those checks, as indicated at block 516 (FIG. 5B). In an embodiment, the advice may include one or more proposed changes to be made to the model. In another embodiment, the advice may include alternate workflows to achieve the goals of a task without changes to the model. An example alternate workflow is performing time-based linearization at multiple times during one simulation instead of trim/linearize at multiple steady-state operating points. The performance engine 116 may apply to the model the advice specified by the checks that generated warnings or failures, as indicated at block 518. For example, the modification and reversion unit 124 of the performance engine 116 may change the model as specified by the advice of a check that generated a warning or failure, thereby creating a changed model. Next, the performance engine 116 may generate new performance data for the changed model, as indicated at block 520. In particular, the performance profiler 120 may obtain performance data during execution of the changed model. The testing unit 126 may determine whether the performance data, such as execution time and/or memory usage, generated for the changed model constitutes an improvement when compared to the baseline performance data that was generated for the source model, as indicated at block 522.

Figure 5A:
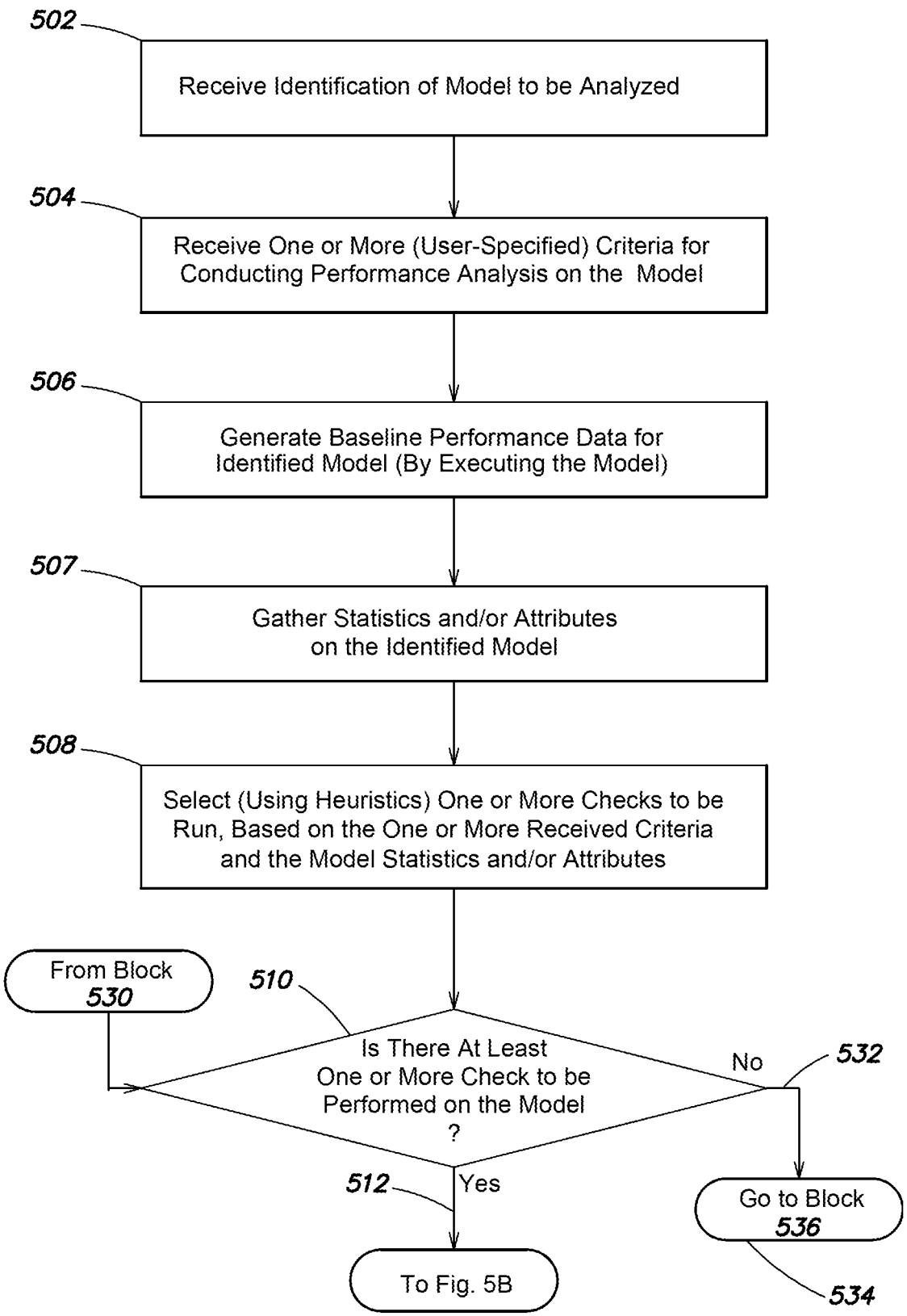
FIGS. 5A-D are partial views of a flow diagram of a method according to an embodiment.
Figure 5B:
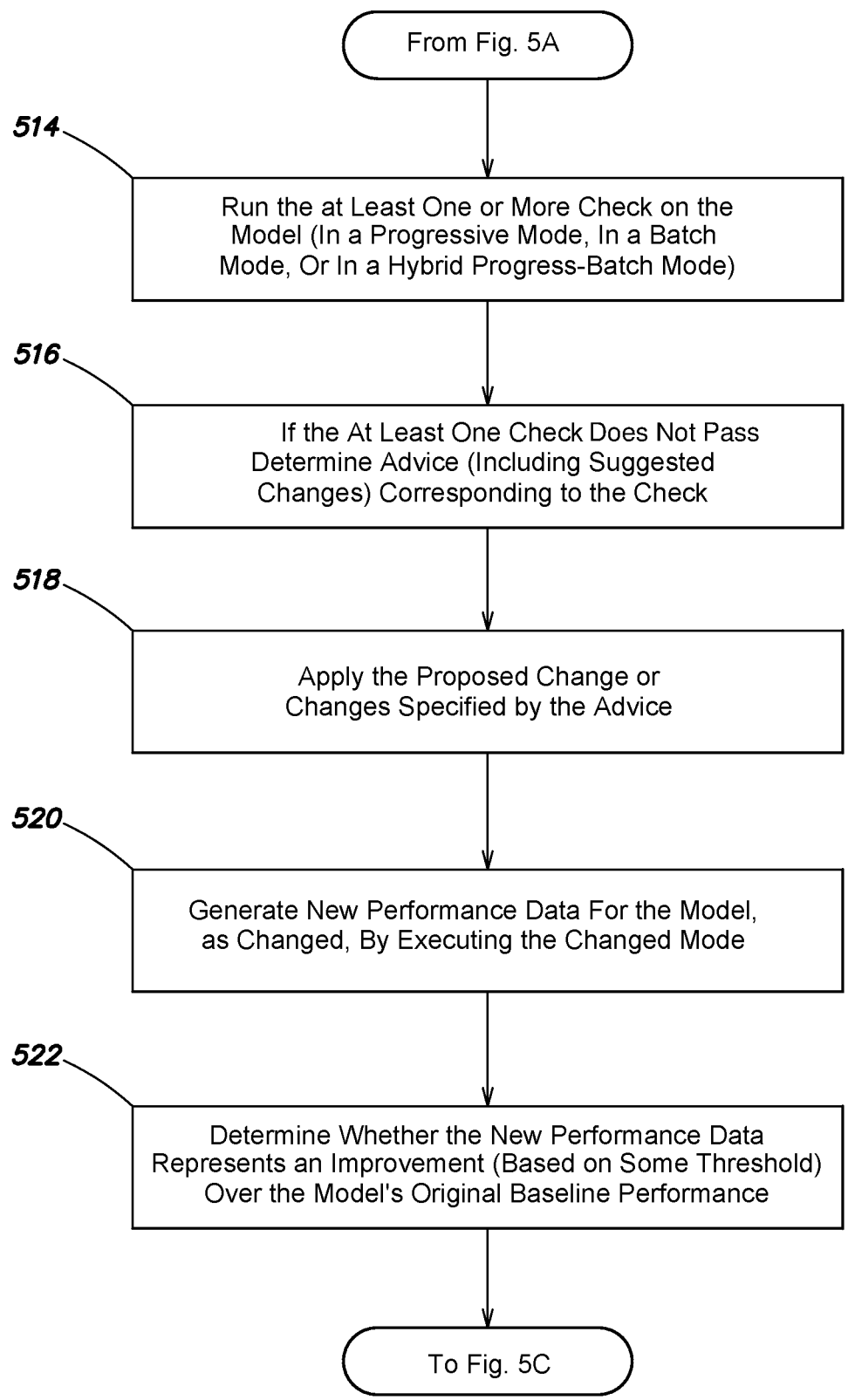
Figure 5C:
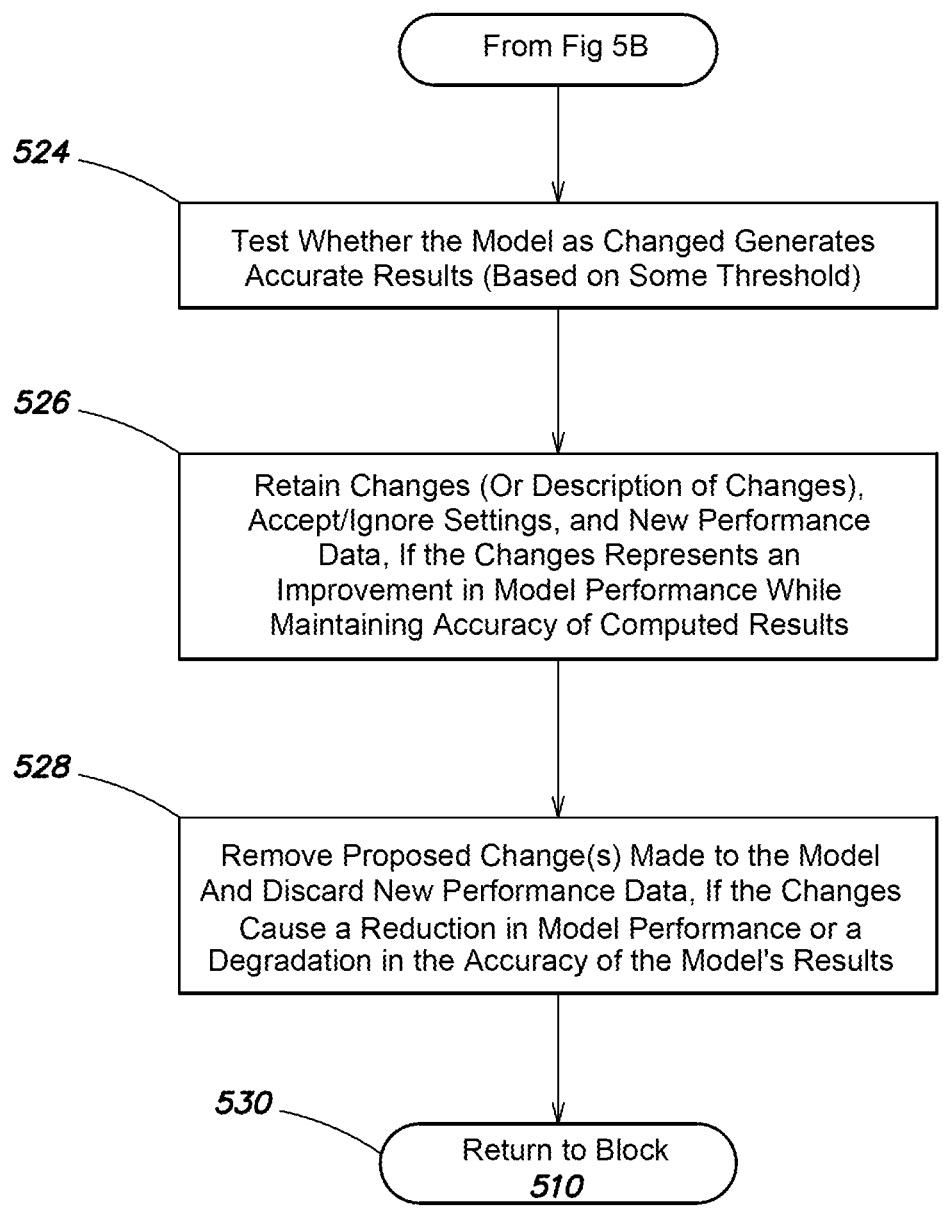

In addition, the testing unit 126 may evaluate the results produced by the changed model during execution, and these results may be compared to the results produced by the original model to determine whether the changed model still produces accurate results, as indicated at block 524 (FIG. 5C). The testing unit 126 may be configured with a default threshold for determining whether model results are equivalent. For example, results computed by the changed model that are within 0.5% of the results generated by the source model may be considered accurate. In an embodiment, the user may set the threshold or tolerance level. For example, the user may set the threshold to a value higher or lower than the default value, such as 0.1% or 5.0%.

As indicated, the performance engine 116 may be configured to determine whether the results produced by the source model are inaccurate or otherwise not reliable, e.g., due to the selection of an improper solver or some other configuration of the source model. In this case, the performance engine 116 may be configured to treat the threshold or tolerance level as a false goal, and advice, such as a proposed change, that causes the model to produce more accurate results may be validated, even though the execution time and/or memory usage increases.

In an embodiment, a user may designate whether certain advice generated by the performance engine 116 should be accepted or ignored. For example, a company using the modeling environment may have a policy disallowing a certain model setting. The user may mark as "ignore" advice regarding that model setting.

If the advice for the check that produced a warning or that failed is validated, that is, the advice is determined to improve the model's performance while still producing accurate or at least acceptable results, as determined automatically by the performance engine 116, then the changes to the model, the new performance data, and the user's current acceptance/ignoring of the advice may be saved, as indicated at block 526. Instead of retaining the changed model, the performance engine 116 may save the advice and/or the proposed changes that were validated as improving the model's performance. If the user specified a target threshold for improving the model's performance, the performance engine 116 may also determine whether the improvement in performance meets and/or exceeds the threshold. If the user indicated that a piece of advice should be ignored, saving the "ignore" state may allow the performance engine 116 to entirely skip over the check in subsequent runs, even though it had previously found a performance benefit. This may increase the usefulness of the performance engine 116 by distinguishing between acceptable and unacceptable changes where the reasons are outside of the performance criteria, leading to improved design discussions among users and process improvements focused on the rejected findings.

User designations for advice may include: run check, then ignore advice; always run check, but never accept advice; and run check once and display outcome in the future, e.g., as a reminder. The fact that the check was run and the advice may be included in the report for review by the user.

At least some of the changes to the model may be stored in a new model configuration set created by the performance engine 116. The model's original configuration set may be left unchanged. The new configuration set may be saved with the model. Thereafter, the user may select the new configuration set as the active configuration set when executing the model. Changes also may be saved in a variant parameter set and saved for later selection by the user. Exemplary variants that may be used include the Model Variants and the Variant Subsystems provided by the Simulink® model-based design product. The variant parameter set may include one or more variant control variables defined in a workspace. One or more variant control variables may be defined for each model variant and each variant subsystem, and a particular model variant or variant subsystem of a source model may be selected by modifying the value of the respective variant control variable.

If the advice for the check fails the validation step; in other words, the performance engine 116 determines that the advice does not improve the model's performance, that the incremental improvement in performance does not exceed the user specified threshold, or that the changes specified by the advice, when made to the model, cause the model to produce results that are not accurate, then the performance engine 116 may undo the changes that were made to the model, e.g., the model may be reverted to its prior version, as indicated at block 528. The performance engine 116 also may discard the newly generated performance data, as also indicated at block 528.

Figure 5D:
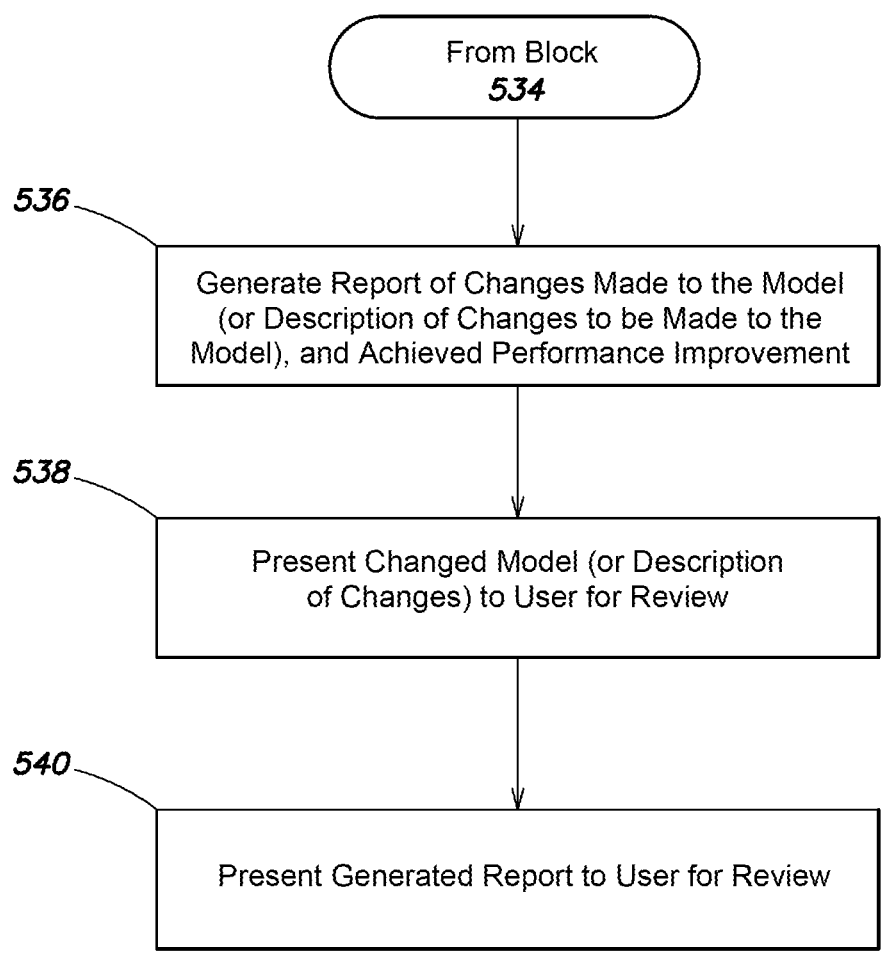

As indicated by Go To block 530, processing may then return to decision block 510 (FIG. 5A). The process represented by blocks 514 to 528 may be repeated so long as there are still checks available that can be run on the model. If there are no more checks to be run, the report generator 128 may generate a report regarding the performance analysis of the model, as indicated by No arrow 532 leading to Go To block 534, which in turn leads to block 536 (FIG. 5D). The performance engine 116 may present the revised model whose changes have been validated as improving the model's performance to the user, as indicated at block 538. The performance engine 116 also may present the generated report to the user, as indicated at block 540.

Figure 6:
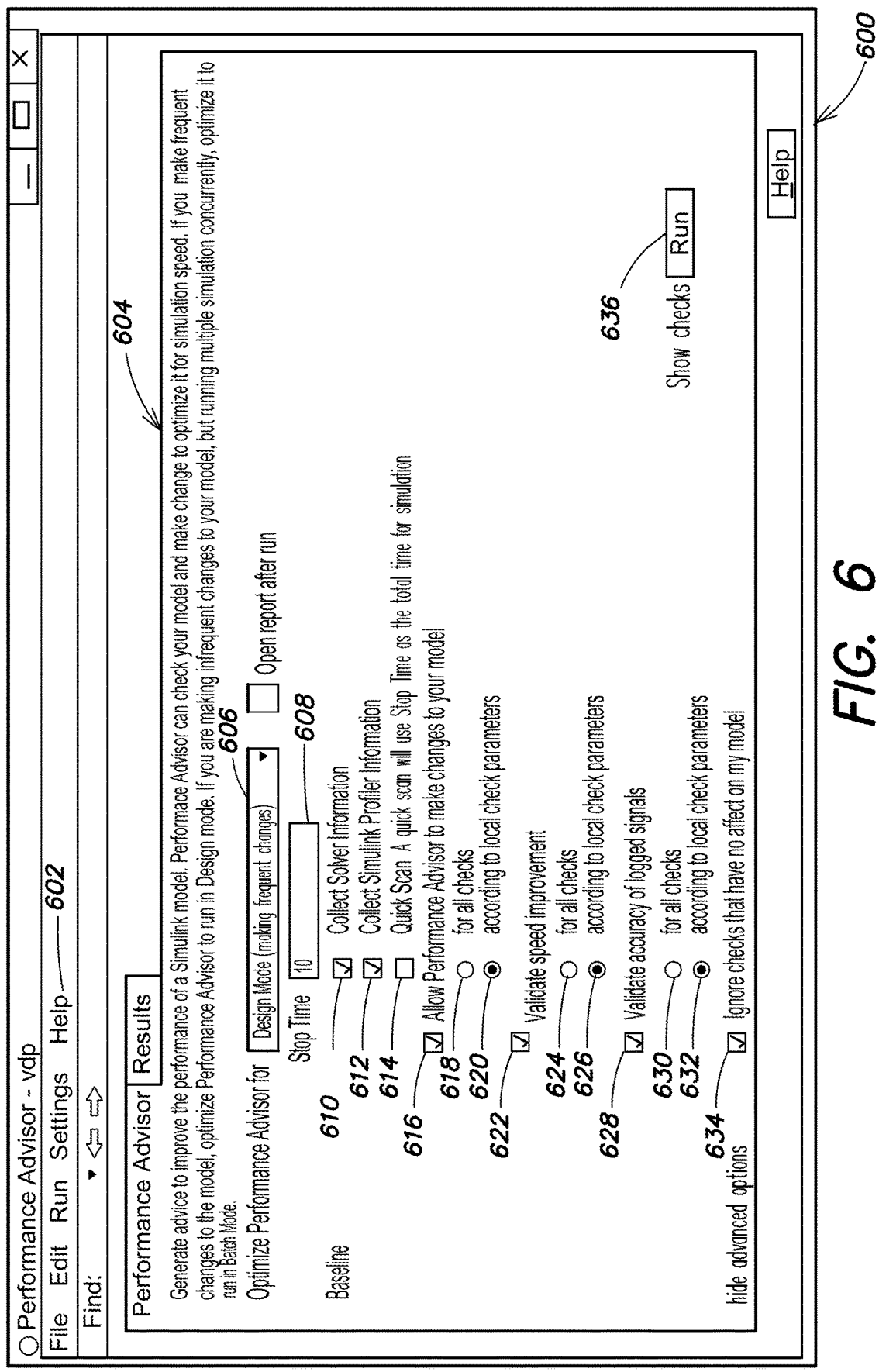
FIG. 6 is a schematic illustration of a User Interface according to an embodiment.

FIG. 6 is a schematic illustration of a first graphical user interface (GUI) 600 associated with the performance engine 116, and presented on a display of a workstation or other data processing device. The first GUI 600 may include a toolbar 602 having a plurality of commands that may be organized and accessed through a series of drop down menus, such as File, Edit, Run, Settings and Help menus. The first GUI 600 also may include one or more panes for presenting information, e.g., to a user. For example, the first GUI 600 may include an Analysis pane 604.

The Analysis pane 604 may include a plurality of interface elements through which a user may direct or control the performance analysis process. In particular, the Analysis pane 604 may include a first drop down menu 606 through which a user may specify a task mode associated with the model being analyzed. The first drop down menu 606 may include a list of available modes that may be selected, such as Design Mode, Batch Mode, etc. The Analysis pane 604 also may include a plurality of interface elements that control the collection of baseline performance information for the model. In particular, the Analysis pane 604 may include a first data entry box 608 in which a user may enter a desired time goal, e.g., in minutes, within which the collection of baseline performance information is to be completed. Here, the user has specified 10 minutes. First, second and third check boxes 610, 612 and 614 may be provided to indicate whether Solver information is to be collected, whether profiler information is to be collected, and whether a quick scan is to be performed. If the quick scan check box 614 is selected, then the value specified in the first data entry box 608 specifies the limit in which the performance analysis process is to be completed. In this way, a user may indicate that the performance engine 116 is to complete its processing in a specified time, e.g., five minutes, ten minutes, 60 minutes, 600 minutes, etc.

The Analysis pane 604 also may include interface elements for setting various options of the performance analysis process. In particular, the Analysis pane 604 may include a fourth check box 616 through which a user may indicate whether proposed changes are to be made to the model, e.g., retained or saved, automatically by the performance engine 116 following the verification of the proposed changes. First and second radio buttons 618 and 620 may be used to indicate whether the proposed changes are to be retained in the model for all checks being performed, or whether the saving of proposed changes will be specified on a check-by-check basis, e.g., in a Checks pane described herein. A fifth check box 622 may be used to indicate whether the performance engine 116 is to validate the execution speed improvement achieved by the checks being run. Third and fourth radio buttons 624 and 626 may be used to indicate whether the validation of execution speed improvement is to be performed for all checks or on a check-by-check basis. A sixth check box 628 may be used to indicate whether the performance engine 116 is to validate the accuracy of logged signals in the model during the performance analysis process. Similarly, fifth and sixth radio buttons 630 and 632 may be used to indicate whether the validation of results is to be performed for all checks or on a check-by-check basis. A seventh check box 634 may be used to indicate whether checks that have no effect on the model should be ignored.

As noted, a user may designate that the advice for one or more checks may be ignored. In addition, during a subsequent running, the performance engine 116 through the heuristics unit 132 may be configured to actively ignore, but acknowledge a check whose advice was previously determined to have no effect on the model. That is, even though the heuristics unit 132 might otherwise include the check for running on the model, it may ignore the check because the check was determined to have no effect during a previous run. Furthermore, the report generator may be configured to include an entry in the report that indicates why a particular check was not run, e.g., because in a previous run the check was determined to have no effect.

The Analysis pane 604 also may include a Run button 636 that, when selected, e.g., by the user, commences the performance analysis process of the model.

Figure 7:
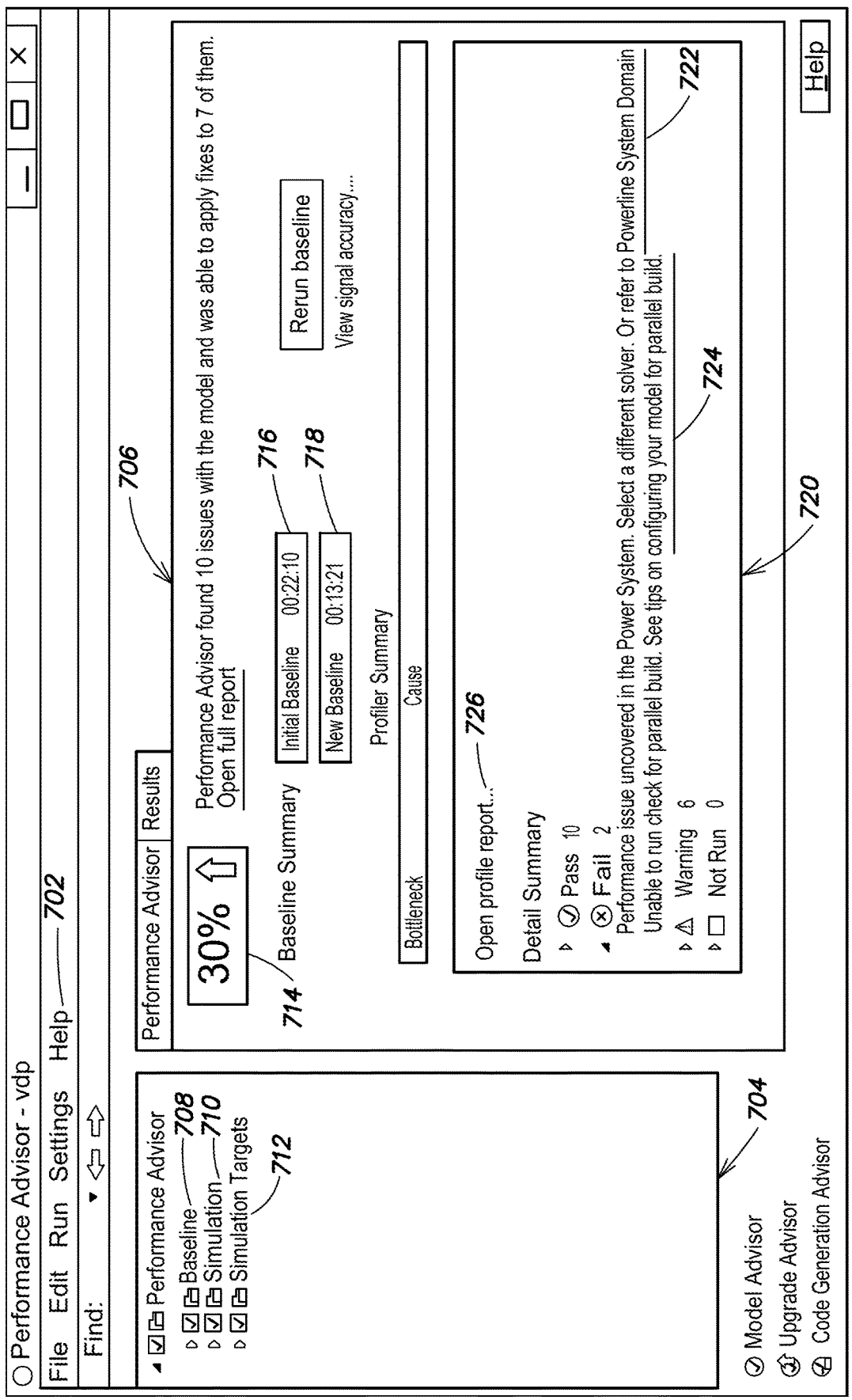
FIG. 7 is a schematic illustration of a summary performance analysis report according to an embodiment.

FIG. 7 is a schematic illustration of a second GUI 700 associated with the performance engine 116, which may also be presented on a display. The second GUI 700 also may include a toolbar 702, and may further include one or more panes for presenting information, e.g., to a user. For example, the second GUI 700 may include a Checks pane 704 and a summary performance pane 706. The Checks pane 704 may include information concerning the performance rules and/or checks that may be run on the model. The checks may be organized as a tree or project in the Checks pane 704. In particular, the checks may be organized by topic, such as Baseline 708, Simulation 710, and Simulation Targets 712, which may be expandable and collapsible to show and hide the particular checks included in those topics. The Baseline 708, Simulation 710 and Simulation Targets 712 topics may include check boxes, which allow a user to select all checks within those topics. Alternatively, the user may expand the topics and pick and choose particular checks.

The summary performance report pane 706 may include a first data element 714 that indicates the performance improvement that was achieved by the performance engine 116, e.g., a 30% reduction in model execution time. It should be understood that the first and second GUIs 600 and 700 are meant for illustrative purposes. The summary performance report pane 706 also may include second and third data elements 716 and 718 that indicate the execution time of the source model, e.g., 22 minutes, ten seconds, and the execution time of the performance-enhanced model, e.g., 13 minutes and 21 seconds. The summary performance report pane 706 may also include a section 720 providing information on the checks. The section 720 may include information regarding the checks that passed, the checks that failed, the checks that produced warnings, and the checks that were not run. As described, checks that failed or produced warnings may be associated with proposed changes that are applied to the model and then tested to determine whether the proposed changes result in improved performance while maintaining accuracy. Regarding the checks that failed, the section 720 may include a first link, such as a hyperlink 722, to a user community that may have information, such as rules or checks concerning one or more of the failed checks. In addition to the first link 722, a second link 724 may be provided to help information.

The section 720 may include a button or link 726 to a detailed report of the performance analysis process.

FIGS. 8A-8F are partial views of a schematic illustration of a portion of a detailed performance analysis report 800. The detailed performance analysis report 800 may include information concerning each check that was run and whether the check passed, failed or produced a warning. The detailed performance analysis report 800 also may include information about proposed changes associated with the checks that failed or produced warnings, and whether those proposed changes have been validated and whether they have been incorporated in a performance-enhanced version of the model. The detailed performance analysis report 800 also may include information about proposed changes that did not result in an improvement in model performance and/or produced inaccurate results, and that such proposed changes were reverted.

The performance analysis report 800 may be organized into sections that correspond to the topics of the checks that were run, e.g., Baseline, Simulation and Simulation Targets, as indicated in the Checks pane 704 (FIG. 7). In particular, the report 800 may include a first section 802 (FIG. 8A) that provides information on the creation of the baseline performance data. Next, the report 800 may include a second section on the checks for the Simulation topic. The second section may extend from FIG. 8A to FIG. 8E. A third section (FIGS. 8E to 8F) may include the checks for the Simulation Targets topic. For each check that is performed, the report 800 may include an indication whether the check passed, e.g., using a green check icon, failed, e.g., using a red X, or generated a warning, e.g., using a yellow exclamation point. In addition, for each check, the report 800 may include a description of the check, an indication of the actions taken by the performance engine 116, an indication of the parameter settings for the check, and an action log that indicates the performance improvement achieved by the check. As indicated at a first entry 804 (FIG. 8C), the Identify resource-intensive settings resulted in several diagnostics being disabled. This, in turn, improved execution time performance by 24.81% as indicated at second entry 806 (FIG. 8B). As indicated at a third entry 808 (FIG. 8C), the Check optimization settings check resulted in worse performance, i.e., 21.31% increase in execution time. Accordingly, the actions suggested by this check were reverted, as indicated at a fourth entry 810 (FIG. 8C).

The checks selected for the model may be applied by the performance engine in a progressive mode where each check is run and, if the check results in a warning or failure, the advice, such as the proposed changes are applied to the model. The performance of the model following the modification and the accuracy of the computed results are then evaluated. If model performance is improved and accuracy is not degraded, the proposed changes and the new performance data are retained, and the next check is evaluated.

Alternatively, at least some of the checks may be applied in a batch mode where the set of checks are run. The proposed changes for all of the checks in the set that result in a warning or failure are then applied to the model. The performance of the model following the application of all of the proposed changes is then determined, as is the model's accuracy. If the model's performance is improved and accuracy is not degraded, then all of the proposed changes and the new performance data may be retained. In addition, the performance engine 116 may apply the checks through a combination of progressive mode and batch mode.

In an embodiment, the user may configure the performance engine 116 not to validate the advice generated by the rules producing warnings and/or failures. For example, the user may disable this feature of the performance engine 116. In this case, the performance engine 116 may return the advice to the user, and the user may apply some or all of the advice to the model and determine whether it results in a performance improvement.

Illustrative Data Processing System

Figure 9:
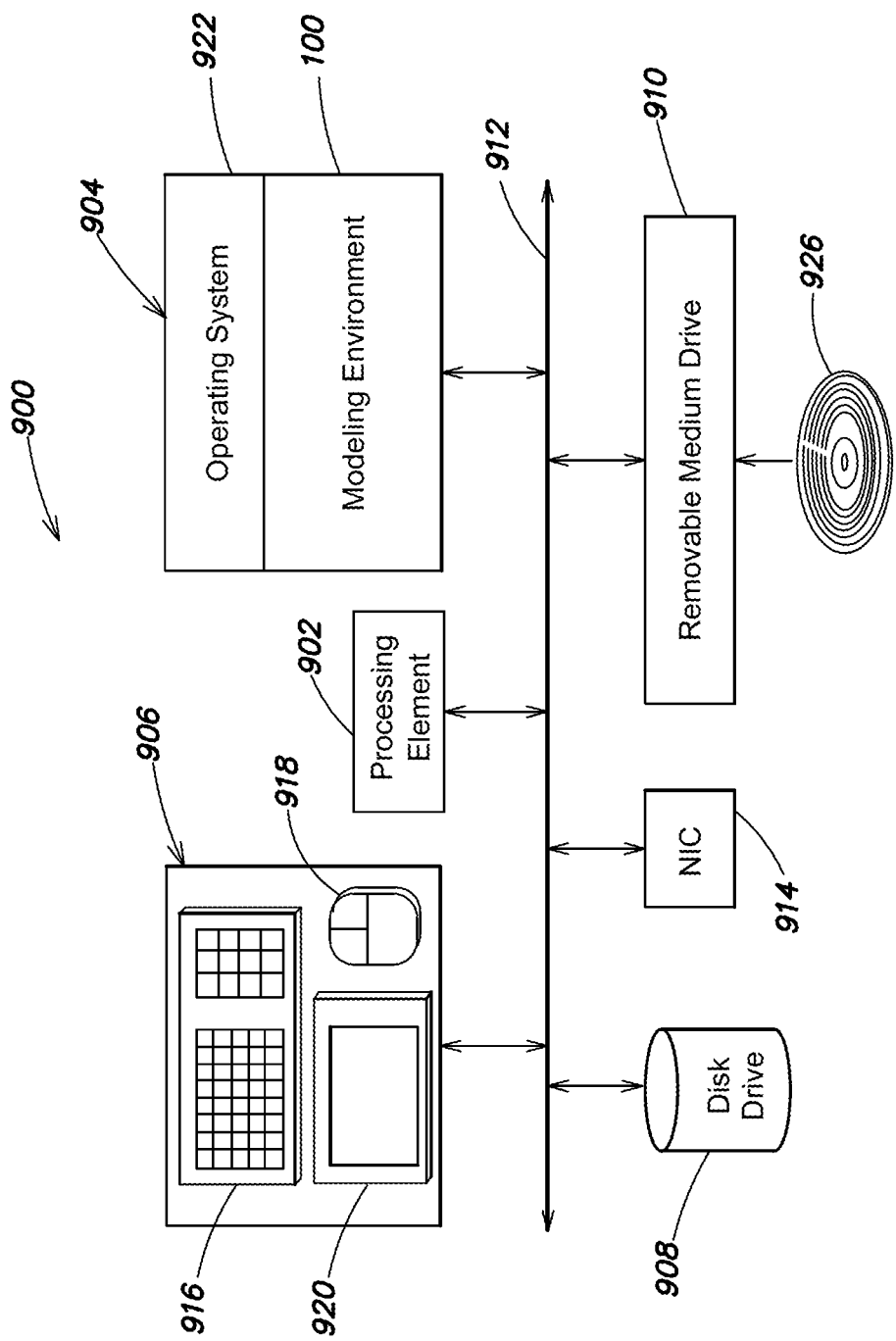
FIG. 9 is a schematic illustration of a data processing device according to an embodiment.

FIG. 9 is a schematic illustration of a computer or data processing system 900 for implementing an embodiment of the invention. The computer system 900 may include one or more processing elements, such as a processing element 902, a main memory 904, user input/output (I/O) 906, a persistent data storage unit, such as a disk drive 908, and a removable medium drive 910 that are interconnected by a system bus 912. The computer system 900 may also include a communication unit, such as a network interface card (NIC) 914. The user I/O 906 may include a keyboard 916, a pointing device, such as a mouse 918, and a display 920. Other user I/O 906 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 904, which may be a Random Access Memory (RAM), may store a plurality of program libraries or modules, such as an operating system 922, and one or more application programs that interface to the operating system 922, such as the modeling environment 100.

The removable medium drive 910 may accept and read a computer readable medium 926, such as a CD, DVD, floppy disk, solid state drive, tape, flash memory or other non-transitory medium. The removable medium drive 910 may also write to the computer readable medium 926.

Suitable computer systems include personal computers (PCs), workstations, servers, laptops, tablets, palm computers, smart phones, electronic readers, and other portable computing devices, etc. Nonetheless, those skilled in the art will understand that the computer system 900 of FIG. 9 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment application 100 may be hosted on a server, and accessed by a remote client through an application hosting system, such as the Remote Desktop Connection tool from Microsoft Corp.

Suitable operating systems 922 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 922 may provide services or functions for other modules, such as allocating memory, organizing data according to a file system, prioritizing requests, etc. The operating system 922 may run on a virtual machine, which may be provided by the data processing system 900.

As indicated above, a user or developer, such as an engineer, scientist, programmer, etc., may utilize one or more input devices, such as the keyboard 916, the mouse 918, and the display 920 to operate the modeling environment 200, and construct one or more models, such as graphical models having executable semantics. In particular, the model may provide one or more of time-based, event-based, state-based, frequency-based, control-flow based, and dataflow-based execution semantics. The execution of a model may simulate operation of the system that is being designed or evaluated. The term graphical model, moreover, is intended to include graphical program.

In an embodiment, multiple tasks may be selected for a source model and, in response, the performance engine 116 may run its performance analysis multiple times, e.g., at least once for each task, and may create and save multiple configuration sets and/or variant parameter sets when the advice is accepted. In subsequent executions of the model, the user may then activate the configuration set and/or variant parameter set that corresponds to the task at hand. The performance engine 116 may be configured to analyze the source model for all of the multiple tasks in one continuous process or operation without interruption and without involvement by the user.

Figure 10:
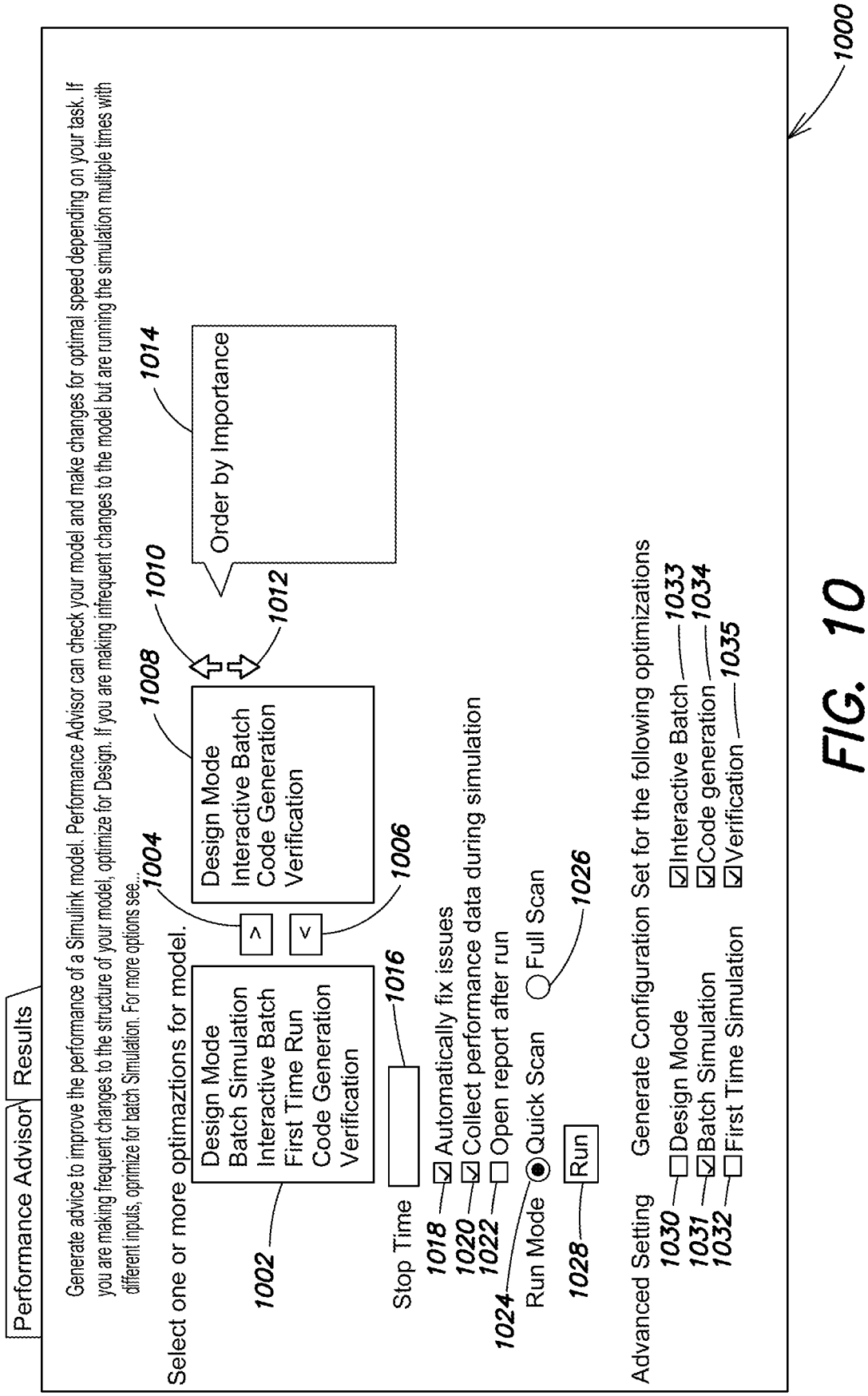
FIG. 10 is a schematic illustration of a User Interface according to an embodiment.

FIG. 10 is a schematic illustration of a GUI 1000 associated with the performance engine 116. The GUI 1000 may include a first text box 1002 that lists a plurality of optimization tasks, an Add button 1004, a Remove button 1006, a second text box 1008 that displays optimization tasks selected by a user, and Up and Down arrows 1010 and 1012 for changing an order of selected optimization tasks presented in the second text box 1008. The list of available optimization tasks presented in the first text box 1002 may include Design Mode, Batch Simulation, Interactive Batch, First Time Run, Code Generation and Verification. It should be understood that the first text box 1002 may include additional or other tasks, such as verification, regression testing, sensitivity analysis, etc. A user may choose multiple desired tasks from the first text box 1002 by selecting the respective tasks and operating the Add arrow 1004. In response, the respective task is added to the second text box 1008. Selection of the Remove arrow 1006 removes a task that was added to the second text box 1008. For example, the user may choose the Design Mode, Interactive Batch, Code Generation and Verification tasks. The user also may operate the Up and Down arrows 1010 and 1012 to change the order of importance of the selected tasks as presented in the second text box 1008. In particular, the order of importance may decrease as you move down the list of tasks presented in the second text box 1008. Tasks listed in the first text box 1002 may be tasks that a user can select into the second text box 1008. The order of the tasks in the second text box 1008 may reflect the importance of the task to the user. For example, if the user, for most of the time works in the design mode, then design mode may be at the top of the second text box 1008.

One or more help windows may be provided in connection with the GUI 1000. The help windows may be presented in response to a user scrolling over an element of the GUI 1000. For example, if the user scrolls a pointer over the Up and Down arrows 1010 and 1012 using a mouse, a popup help window 1014 providing information on the use of the Up and Down arrows 1010 and 1012 may be presented on the GUI 1000.

The GUI 1000 may further include a first data entry box 1016 labeled Stop Time in which a user may enter a desired time goal, e.g., in minutes, for completing the performance analysis of the source model. The GUI 1000 also may include a plurality of checkboxes for selecting various settings of the performance analysis process. In particular, the GUI 1000 may include a first checkbox 1018 for specifying whether the performance engine 116 is to automatically fix issues validated as improving the performance of the source model, a second checkbox 1020 for specifying whether performance data is to be collected, and a third checkbox 1022 for specifying whether a report is to be opened following the performance analysis process.

The GUI 1000 also may include one or more radio buttons for specifying other settings. For example, the GUI 1000 may include first and second radio buttons 1024 and 1026 for specifying whether a quick or full scan is to be conducted. Those checks that have been determined to take a shorter time to complete may be grouped into a 'Quick Scan' group. If a user wants an analysis to be done quickly, the user may select the 'Quick Scan' radio button 1024. While the checks included in the quick scan group should complete quickly, they may not generate optimal advice. On the other hand, if the user wants a more complete analysis to be performed, the user may select the 'Full Scan' radio button 1026, which means all of the checks selected will be run.

A Run button 1028 may also be provided in the GUI for commencing the performance analysis process of the source mode according to the selected tasks as included in the second text box 1008. The GUI 1000 also may include additional checkboxes for specifying whether the performance engine 116 is to create configuration sets for one or more of the multiple tasks as selected in the second text box 1008. Specifically, the GUI 1000 may include a plurality of checkboxes 1030-1035 for the available tasks as presented in the first text box 1002. To the extent the user has added desired tasks to the second text box 1008, the user may also choose whether to have configuration sets generated for one or more (or all) of these tasks by selecting the respective checkboxes 1030-1035.

In response to selecting the Run button 1028, the performance engine 116 may be configured to analyze the source model multiple times, e.g., at least once for each task. That is, the performance engine 116 may identify checks to optimize the performance of the source model for an interactive task, and to validate the advice of those checks. The advice validated as improving the source model's performance for an interactive task may be saved. In particular, the advice may be saved in the source model as a configuration set and/or variant parameter set. The performance engine 116 may save the advice depending on the settings of the checkboxes 1030-1035. That is, only the advice for those tasks whose respective checkboxes 1030-1035 are selected may be saved. The performance engine 116 may similarly proceed to analyze the source model for the other user-selected tasks, e.g., batch, code generation and verification. The performance engine 116 may perform the analysis for each task as part of a single overall analysis process of the source model. That is, the performance engine 116 may run once, but analyze the source model, and generate advice for multiple different model tasks. The advice validated for each task also may be saved.

It should be understood that the GUI 1000 may include other checkboxes or other window elements for specifying whether variant parameter sets for the selected tasks are to be generated and saved. Alternatively, a single checkbox or other window element may be used for specifying whether to save the advice for the respective task regardless of the format in which that advice is generated, e.g., optimized configuration sets, optimized variant parameter sets, performance optimized models, etc.

The ability of the performance engine 116 to analyze a source model for a plurality of different tasks and generating and saving the advice for all of the tasks, all as part of a single performance analysis run, is much preferred to either having (A) only one optimized configuration set, or (B) re-running the performance engine 116 each time the user needs to change tasks. As discussed, the performance engine 116 may be configured to generate multiple optimized configuration sets and/or variant parameter sets during a single performance analysis run of the source model.

Figure 11:
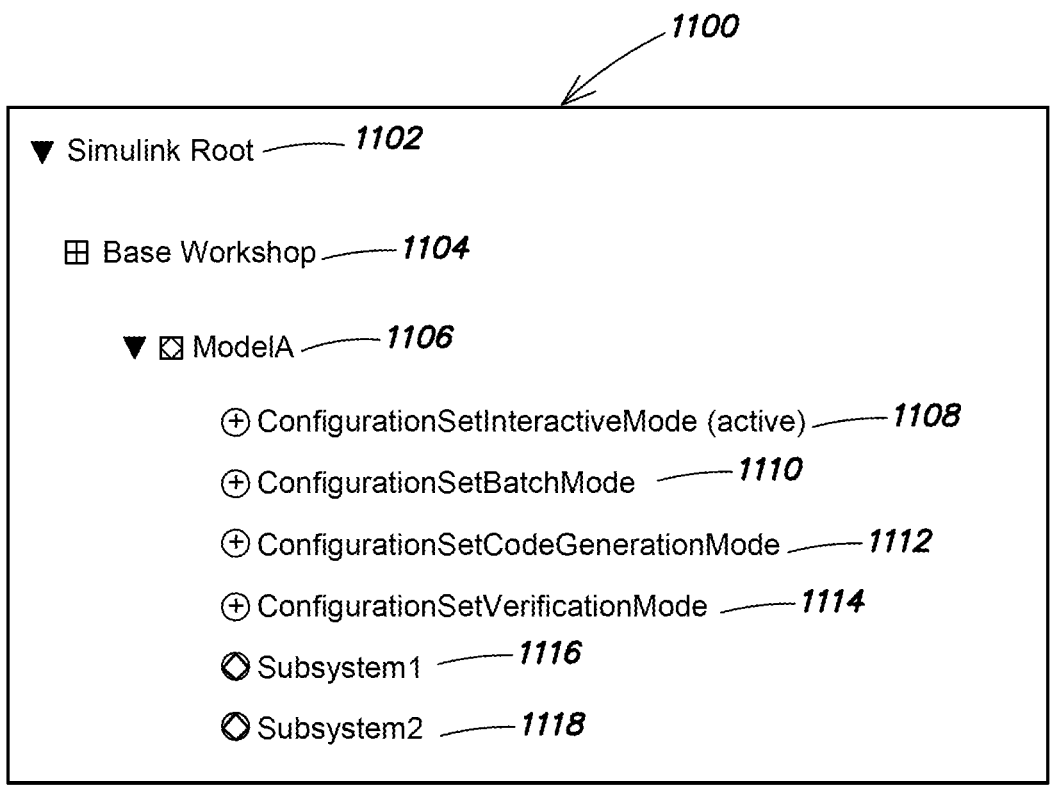
FIG. 11 is a schematic illustration of a portion of a model explorer window according to an embodiment.

FIG. 11 is a schematic, partial illustration of a model explorer window or dialog 1100 for a source model. The model explorer dialog 1100 provides a hierarchical list of elements associated with the source model. At least some of the elements may be expanded to provide additional information on the respective element. The model explorer dialog 1100 may include a Simulink Root node 1102 at the top of the hierarchy. The dialog 1100 also may include a base workspace node 1104 and a model node 1106, e.g., ModelA, that corresponds to the source model. Within the model node 1106 may be a plurality of nodes including a plurality of configuration set nodes, such as a first configuration set node 1108 for an interactive task, a second configuration set node 1110 for a batch task, a third configuration set node 1112 for a code generation task, and a fourth configuration set node 1114 for a verification task. The model node 1106 also may include nodes for subsystems included within the source model, such as first and second subsystem nodes 1116 and 1118 for first and second subsystems of the source model.

Depending on the particular task that the use may wish to perform with the source model, the user may select the respective configuration set so as to obtain an optimized version of the source model for that particular task. For example, suppose the user wishes to run the source mode for an interactive task. In this case, the user may select the first configuration set 1108 and make it the active configuration set. After making the first configuration set 1108 the active configuration set, the user may run, e.g., execute the source model. The first configuration set contains model settings that were validated as improving the source model's performance for an interactive task. At other times, which may occur much later, the user may wish to use the source model for other tasks. In this case, the user selects one of the other configuration sets 1110-1114. For example, weeks or months later, the user may wise to generate code for the source model. In this case, the user may select the third configuration set node 1112, and make it the active configuration set for the source model. The third configuration set contains model settings that were validated as improving the source model's performance for code generation.

In a similar manner, multiple variant parameter sets may additionally or alternatively be created for the various tasks.

As shown, the various configuration sets may be saved along with the source model. In other embodiments, the configuration sets, the variant parameter sets or the validated advice may be saved separately from the source model, for example in one or more files.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 5A-5D, the order of the acts may be modified in other implementations. Further, non-dependent acts may be performed in parallel, and one or more acts may be omitted. For example, the generation of a report, among other tasks, may be omitted.

Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more tangible computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
generating baseline performance data based on a baseline performance of an executable source model;
selecting automatically, by a first processor, a plurality of checks to be run on the executable source model, the plurality of checks,
  when run on the executable source model, either pass when conditions or settings associated with the plurality of checks are not detected in the executable source model or do not pass when the conditions or the settings are detected in the executable source model, and
  are associated with proposed model changes that affect the baseline performance of the executable source model;
running the plurality of checks on the executable source model, wherein at least one of the plurality of checks does not pass;
applying to the executable source model automatically, by the first or a second processor, one or more of the proposed model changes that are associated with the at least one of the plurality checks that does not pass;
generating new performance data based on a new performance of the executable source model after the one or more of the proposed model changes are applied to the executable source model;
comparing, by the first, second or a third processor, the new performance data to the baseline performance data to determine whether the new performance represents an improvement over the baseline performance of the executable source model in at least one of execution speed or memory usage; and
retaining the one or more of the proposed model changes when the new performance is determined to represent the improvement over the baseline performance of the executable source model.

2. The method of claim 1 wherein
the applying the one or more of the proposed model changes includes entering the one or more of the proposed model changes to the executable source model.

3. The method of claim 1 further comprising
undoing the one or more of the proposed model changes to revert back to the executable source model, when the new performance is determined not to be the improvement over the baseline performance of the executable source model.

4. The method of claim 1 further comprising:
receiving at least one criterion for improving the baseline performance of the executable source model, wherein
the selecting is based on the at least one criterion for improving the baseline performance of the executable source model.

5. The method of claim 4 wherein the at least one criterion is at least one of:
a time limit for performing a performance analysis on the executable source model,
an interactive simulation mode, and
a batch input data simulation mode.

6. The method of claim 4 wherein the at least one criterion is user-specified.

7. The method of claim 4 wherein the at least one criterion is a time goal for performing a performance analysis on the executable source model.

8. The method of claim 1 further comprising:
receiving at least one criterion for improving the baseline performance of the executable source model, wherein
the plurality of checks selected for the executable source model conform to the at least one criterion for improving the baseline performance of the executable source model.

9. The method of claim 1 further comprising:
receiving an indication to ignore information associated with a selected check that does not pass.

10. The method of claim 1 further comprising:
receiving an indication to skip running a selected check.

11. The method of claim 1 further comprising:
connecting to a community network; and
retrieving at least one of the plurality of checks from the community network.

12. The method of claim 1 wherein
a selected proposed model change for a given check that does not pass is a change to a model parameter, and
the change to the model parameter is saved in at least one of a configuration set and a variant parameter set for the executable source model.

13. The method of claim 12 wherein
the configuration set includes a plurality of model parameter settings, and
the variant parameter set includes one or more variant controls for a model variant or a variant subsystem of the executable source model.

14. The method of claim 1, further comprising:
outputting a revised model that includes
  the one or more of the proposed model changes,
  a description of the one or more of the proposed model changes, or
  both the revised model and the description of the one or more of the proposed model changes.

15. The method of claim 1 wherein
the one or more of the proposed model changes are saved in a plurality of configuration sets for the executable source model, and
the plurality of configuration sets are associated with different model execution tasks.

16. The method of claim 1 wherein the executable source model is a text-based model, a graphical model, or a combination text-based and graphical model.

17. An apparatus comprising:
an output device;
processing logic configured to:
  generate baseline performance data based on a baseline performance of an executable source model;
  receive a performance analysis criterion;
  identify one or more attributes of the executable source model;
  select a plurality of performance rules based on the performance analysis criterion and the one or more attributes of the executable source model, the plurality of performance rules,
    when run on the executable source model, either pass when conditions or settings associated with the plurality of performance rules are not detected in the executable source model or do not pass when the conditions or the settings are detected in the executable source model, and
    include proposed model changes that affect the baseline performance of the executable source model;
  run the plurality of performance rules on the executable source model, wherein at least one of the plurality of performance rules does not pass;

apply to the executable source model one or more of the proposed model changes included with the at least one of the plurality of performance rules that does not pass when run on the executable source model;

generate new performance data based on a new performance of the executable source model and after the one or more of the proposed model changes are applied to the executable source model; and retain the one or more of the proposed model changes when the new performance is better than the baseline performance based on a comparison of the new performance data and the baseline performance data, indicating an improvement in at least one of execution speed or memory usage of the executable source model; or undo the one or more of the proposed model changes when the new performance is not better than the baseline performance.

18. The apparatus of claim 17 wherein the plurality of performance rules specify the conditions that are tested when the plurality of performance rules are run on the executable source model, if a particular condition of a given performance rule is not satisfied in the executable source model, the given performance rule passes, and if the particular condition of the given performance rule is satisfied in the executable source model, the given performance rule does not pass.

19. The apparatus of claim 17 wherein the processing logic is further configured to:

display a revised executable source model that includes the proposed changes that are retained.

20. A non-transitory computer-readable medium comprising program instructions, the program instructions including instructions to:

generate baseline performance data based on a baseline performance of an executable source model;

identify, by a first processor, a plurality of checks for the executable source model, the plurality of checks having conditions that are either satisfied or not satisfied by the executable source model, and associated with proposed model changes that affect the baseline performance of the executable source model;

apply to the executable source model one or more of the proposed model changes associated with a given check, of the plurality of checks, found to be satisfied by the executable source model;

determine whether the one or more of the proposed model changes associated with the given check represents an improvement to the baseline performance of the executable source model, wherein the improvement to the baseline performance of the executable source model indicates an improvement in at least one of execution speed of the executable source model or memory usage of the executable source model; and retain the one or more of the proposed model changes, when the one or more of the proposed model changes represents an improvement to the baseline performance of the executable source model; or undo the one or more of the proposed model changes, when the one or more of the proposed model changes fails to represent an improvement the baseline performance of the executable source model.

21. The non-transitory computer readable medium of claim 20 further comprising program instructions to:

identify groups of checks, where the groups of checks correspond to different model tasks;

retain, for each model task, a set of proposed model changes validated as improving the baseline performance of the executable source model for the respective model task;

receive a designation of a selected set of proposed model changes as an active set for the executable source model.

22. The non-transitory computer readable medium of claim 21 where the model tasks include:

an interactive task, a batch task, a code generation task, and a verification task.

23. The non-transitory computer readable medium of claim 21 where the sets of proposed model changes are saved in configuration sets for the executable source model.

* * * * *